US012723574B2

(12) United States Patent
Keidar et al.

(10) Patent No.: US 12,723,574 B2
(45) Date of Patent: Sep. 1, 2026

(54) SELF-NEUTRALIZING AIR-BREATHING PLASMA THRUSTER

(71) Applicant: The George Washington University, Washington, DC (US)

(72) Inventors: Michael Keidar, Baltimore, MD (US); Anmol Taploo, Washington, DC (US); Li Lin, Arlington, VA (US)

(73) Assignee: The George Washington University, Washington, DC (US)

( * ) Notice: Subject to any disclaimer, the term of this patent is extended or adjusted under 35 U.S.C. 154(b) by 177 days.

(21) Appl. No.: 18/336,425

(22) Filed: Jun. 16, 2023

(65) Prior Publication Data

US 2024/0117797 A1 Apr. 11, 2024

Related U.S. Application Data

(60) Provisional application No. 63/353,294, filed on Jun. 17, 2022.

(51) Int. Cl.
*F03H 1/00* (2006.01)
*H05H 15/00* (2006.01)

(52) U.S. Cl.
CPC ........... *F03H 1/0037* (2013.01); *H05H 15/00* (2013.01); *F03H 1/0087* (2013.01)

(58) Field of Classification Search
CPC ...... F03H 1/0037; F03H 1/0087; H05H 15/00
See application file for complete search history.

(56) References Cited

U.S. PATENT DOCUMENTS

| | | | | | |
|---|---|---|---|---|---|
| 3,071,705 | A * | 1/1963 | Coleman | F03H 1/00 | 62/3.1 |
| 3,177,654 | A * | 4/1965 | Gradecak | B64G 1/413 | 60/264 |
| 3,760,225 | A * | 9/1973 | Ehlers | H01J 37/32055 | 315/98 |
| 3,789,310 | A * | 1/1974 | Mancebo | H01J 1/304 | 372/98 |
| 6,834,492 | B2 * | 12/2004 | Hruby | F03H 1/0075 | 60/202 |
| 7,581,380 | B2 * | 9/2009 | Wahl | F03H 1/0043 | 60/202 |
| 10,995,737 | B2 * | 5/2021 | Knoll | H02N 3/00 | |
| 11,143,171 | B2 * | 10/2021 | Winglee | F03H 1/0087 | |

OTHER PUBLICATIONS

Qi et al., "A Vacuum Arc Ion Thruster for Space Propulsion", Report #aasc98TM-12, Alameda Applied Sciences Corporation, Mar. 1998, pp. 1-35. (Year: 1998).*

Anmol Taploo, Li Lin, Michael Keidar, "Analysis of Ionization in Air-breathing Plasma Thruster", Physics of Plasmas, vol. 28, Sep. 2021, pp. 1-17. (Year: 2021).*

Taploo et al., "Air ionization in self-neutralizing air-breathing plasma thruster," Journal of Electric Propulsion, Nov. 17, 2022, 19 pages.

* cited by examiner

*Primary Examiner* — Lorne E Meade
(74) *Attorney, Agent, or Firm* — BLANK ROME LLP

(57) ABSTRACT

A plasma thruster has a tunable electron source configured to provide electrons with controllable energy. An entry electrode and an exit electrode permit an air flow to pass from the entry electrode to the exit electrode. The entry electrode and exit electrode receive electrons from the tunable electron source. A controller selectively controls the entry and exit electrodes to accelerate positive and negative ions in the air.

12 Claims, 26 Drawing Sheets

SELF-NEUTRALIZING AIR-BREATHING PLASMA THRUSTER

RELATED APPLICATION

This application claims the benefit of priority of U.S. Provisional Application No. 63/353,294, filed on Jun. 17, 2022, the entire content of which is relied upon and incorporated herein by reference in its entirety.

STATEMENT REGARDING FEDERALLY SPONSORED RESEARCH OR DEVELOPMENT

This invention was made with government support under FA9550-19-1-0166 awarded by the Air Force Office of Scientific Research, and under 80NSSC20M0092 awarded by the National Aeronautics and Space Administration (NASA). The government has certain rights in the invention.

BACKGROUND

Recently, there has been a keen interest in researching and developing an air-breathing plasma thruster (ABPT) for very low earth orbit applications, typically in 80-260 km. ABPT uses incoming air propellant that is ionized and then consequently accelerated to produce thrust. Typically thrust level (90 mN-90 N) is required to cancel drag that is (60 mN-60 N) substantial at low altitudes. With an ABPT at a low altitude, there are many advantages: increased satellite resolution, weight reduction, and low launch cost. Additionally, with an increased number of spacecraft in high orbit, ABPT could be advantageous by effectively utilizing space resources and burning up on re-entry to prevent the formation of space debris. ABPT allows the elimination of propellant storage tanks and, therefore, the extension of the service lifetime of the satellite. However, many physical and operational challenges need to be addressed when dealing with these thrusters. The major challenge is developing an optimum approach to efficiently ionize air in a rarefied environment within an altitude range of 80-260 km. Due to the low density of gas at these altitudes, collimator designs are often used, introducing additional drag. With their study for ESA's GOCE mission, Wallace, Jameson, and Saunders mentioned that the thrust required appeared lower than anticipated for flying at this altitude. Ferrato, Giannetti, and Piragino's RAM electric propulsion study for air-breathing plasma engines evokes the current design performance limitation of air-breathing plasma engines as unable to produce positive thrust. The maximum thrust it could provide was 6 mN, but the drag was almost 26 mN. The proposed design of the ABPT engine has similarities with a scramjet in terms of the flow and inlet design. In a scramjet-type ABPT configuration, the incoming air is at a high speed that is not deaccelerated, unlike with a ramjet. This could potentially eliminate the complexity of using a collimator (which increases the pressure and reduces the velocity) and reduces drag. Its objectives drive the maximum mission timeline of a spacecraft for maintaining the orbit. Its life is heavily dependent upon material degradation due to erosion and the amount of propellant that it can carry.

There has been substantial experimental, modeling, and theoretical work done in air-breathing electric engines. This includes Cara, Amo, and Roma's design with a satellite mass of 1000 Kg that utilizes 4 inductive plasma thrusters and consumed power of 2.9 kW. A small-sat design by Diamant was proposed for application at 200 km altitude using a 2-stage cylindrical HET (Hall Effect Thruster) with ECR (electron cyclotron resonance) ionization first stage while utilizing 1 kW power. Shabshelowitz's design, a spacecraft powered by a combination of RF plasma and air-breathing electric engine feasibility, was explored at 200 km altitude by using a single-stage HET engine equipped with a propellent redundant tank. A potential scramjet-type ABPT design by Pekker and Keidar was proposed that used a HET type of acceleration. It was shown that such an engine could provide total drag compensation at 90-95 km altitudes. Hruby, Pote, and Olson considered a HET that used carbon dioxide as a propellant for the air-breathing plasma engine application for the Martian atmosphere. A Monto-Carlo air intake analysis study for Kazuhisa Fujita's proposed conceptual design (that could use an ECR device for ionizing air) showed the possibility of its operation in SSO orbit for power less than 3 kW. Romano, Ballester, and Binder's design, an inductive plasma thruster (IPT), was built that used 20 kW power using a 4 MHz radiofrequency generator. Based on the designs mentioned above, it was observed that the power requirement increased for lower altitudes to counter increased drag. Most of the designs mentioned have used a HET engine. While the designs mentioned above were built and tested, the ionization process was not discussed in detail.

Recently, there has been a growing interest in the research and development of propulsion devices for very low earth orbits. These devices would typically function with a thrust level of about 90 mN-90N to counteract drag level (60 mN-60N) in 80 km-260 km altitude ranges. The air-breathing plasma thruster would operate by in situ air propellant ionization to produce thrust in these altitudes. This device brings advantages such as low launch cost, payload reduction by eliminating propellant tanks, effective utilization of space resources, and enhanced imaging capability. However, there are some physical and operational challenges, such as developing an optimum approach to air ionization in a rarefied gas environment and building collimator-less designs (collimators introduce additional drag). In their study for ESA's GOCE mission, Wallace, Jameson, and Saunders mentioned that the thrust required appeared lower than anticipated for flying at this altitude. Ferrato, Giannetti, and Piragino's RAM electric propulsion study for air-breathing plasma engines evokes the current design performance limitation of air-breathing plasma engines as unable to produce positive thrust. The maximum thrust it could provide was about 6 mN, but the drag was almost 26 mN.

Recently it was proposed to use a scramjet-type configuration without air collimation. In a scramjet-type configuration, the incoming air is at a high speed that is not deaccelerated, unlike with a ramjet. This configuration could potentially eliminate the complexity of using a collimator (which increases the pressure and reduces the velocity) and reduces drag. Typically, an air-breathing plasma thruster would require an external neutralizer to inject electrons for ion beam neutralization. Whereas we propose a self-neutralizing air-breathing plasma thruster (SABPT) design that utilizes positive and negative ions to achieve beam neutralization. Earlier, it was shown theoretically that the SABPT has the potential to achieve self-neutralization by operating in a high to low electron energy mode operation. The ions generated inside the thruster could be extracted using electrodes with alternating potential (based on the polarity of the ion charge to extract). As a result, the charge densities would cancel out to achieve a self-neutralized beam. To achieve the design requirements, the electron source inside the SABPT would need to have prominent control over the electron energy for the generation of positive and negative ions.

Additionally, its operation would require stability in harsh air plasma environments. To that end, we propose a low-power vacuum arc electron source as a potential electron source to fulfill the SABPT design requirements.

Vacuum are technology has been studied starting from the 19th century. Gilmour and Lockwood conducted experiments to create vacuum arcs with various cathode materials for small propulsion systems with high power densities while simultaneously utilizing magnetic fields to focus the plasma jet. Zhuang et al. and Keidar et al. developed vacuum arc thrusters for the phone sat project at NASA Ames research center and BRIC-Sat CubeSat for US Air Force. The authors also developed an integrated compact magnetic field design for the thrusters. In ion sources, the article describes the development of plasma cathode electron guns using hollow anode and arc discharges. Vacuum arc thrusters exhibit the possibility of multimodal operation. Based on the previous work on the vacuum arcs and electron sources, we propose an arc electron source for the SABPT. The arc electron source (AES) has numerous advantages such as ease of design, long lifetime, ability to work in harsh plasma environments (vacuum-medium pressure range), does not require a separate gas flow rate, utilizes its cathode as a plasma source, and stable operation in pulsed regime while consuming less power. In conclusion, to avoid propellant storage and complicated designs, AES air ionization with self-neutralization capabilities for SABPT can be incorporated.

SUMMARY

The primary focus of the present disclosure is to study the ionization inside an air-breathing plasma thruster (ABPT) in low earth orbit applications. For this high-speed technology to work, a high degree of ionization needs to be achieved. The present disclosure focuses on plasma chemistry simulation for air in the low earth orbits (80-110 km) to explore the possibility of high ionization of incoming air. The results of the plasma chemistry simulation showed the variation of ionization degree and species densities concerning the mean input energy that contributed to the chemical reactions. This research is essential to understand the ionization processes to develop a low earth orbit ABPT design. Our results have indicated the possibility of building ABPT without an external neutralizer. neutralization is created by extracting negative and positive ions to obtain neutralization, thereby eliminating existing designs' complexity.

The present disclosure describes an arc electron source for air ionization applications in a self-neutralizing air-breathing plasma thruster. The arc electron source is an electron source with a prominent level of electron energy control that is required for the air-breathing plasma thruster. The mean energy of the electrons in the arc electron source is controlled by changing the grid voltage in the range of 0V-300V. The Langmuir/Faraday probes were used to obtain ion/electron current, electron temperature, and electron density as a function of pressure and electron energy. Ion current measurements concerning distance from the source were obtained as a function of pressure and grid voltage. Optical emission spectroscopy was used to obtain electron temperature, spectral intensities, and ion formation rate. Additionally, a drift tube based on radial magnetic field electron confinement was designed to detect the presence of negative ions. It has been shown that both positive and negative ions can be produced thus providing conditions for a self-neutralizing air-breathing plasma thruster.

BRIEF DESCRIPTION OF THE DRAWINGS

FIG. 1A shows a pulse wave design that produces positive and negative ions and FIG. 1B shows where $T_1$, $T_2$, $Te_1$, and $Te_2$ represent low and high energy mode operation times and mean electron energies. The magnetized region for the Hall effect was set in the acceleration region to maintain an electric field that accelerates ions. This is an example of ABPT based on Hall effect type acceleration.

FIG. 6 shows variation of electron, ions ($N^+$, $O_2^-$, $N_2^+$, $O^-$, O and $O_2^+$) and neutral species (N, $N_2$, O, and $O_2$) number densities with time for different mean electron energies (1-200 eV). This was performed for a 110 km altitude.

Figure 18A:
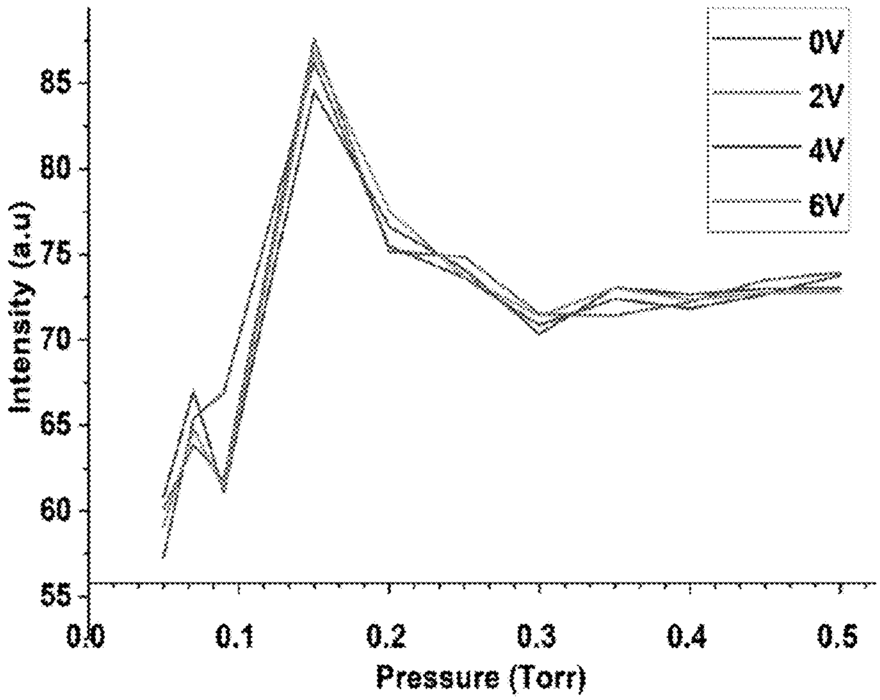
FIG. 18 shows the results for $O_2$ $$\left(406.45 \text{ nm}, A^3\sum\nolimits_u^+ \Rightarrow X^3\sum\nolimits_g^-, v'=0,\ v''=7\right)$$
Figure 18B:
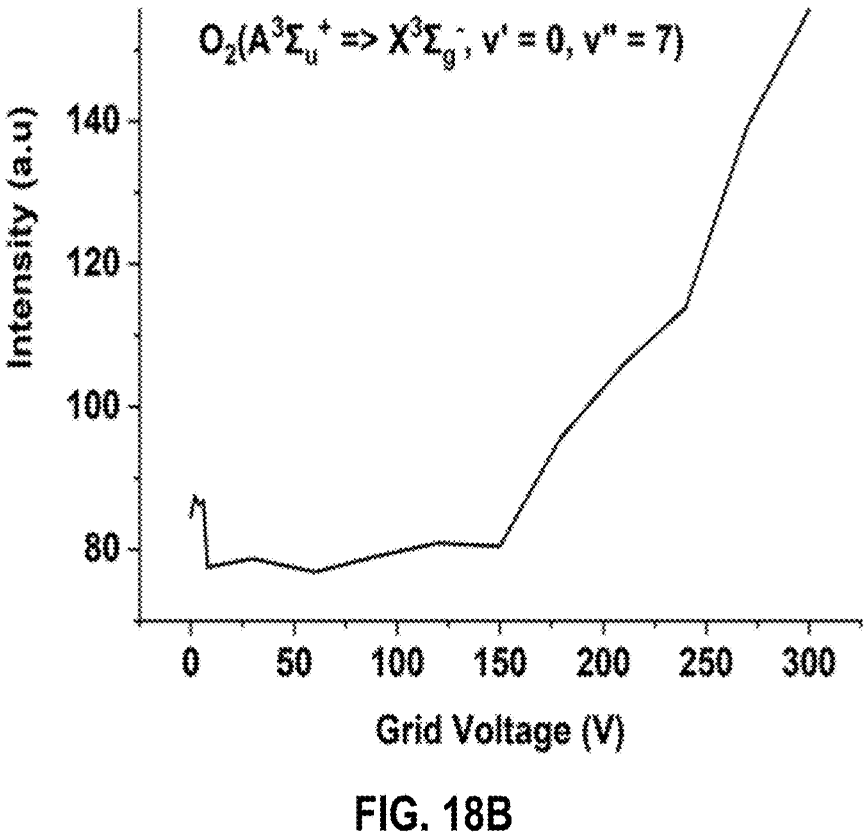

emission line is shown. The oxygen emission peaks at 0.15 Torr pressure, FIG. 18A, at a grid voltage range of 0V-6V. The intensity of $O_2$ initially reduces up to 4V, FIG. 18B, and then increases with the grid voltage.

Figure 19A:
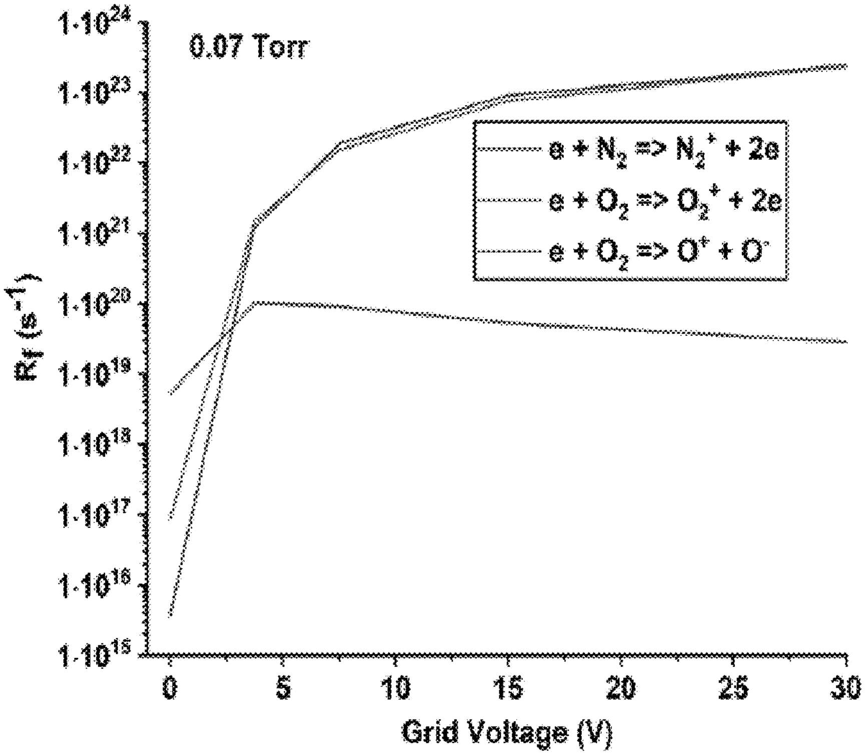
Figure 19B:
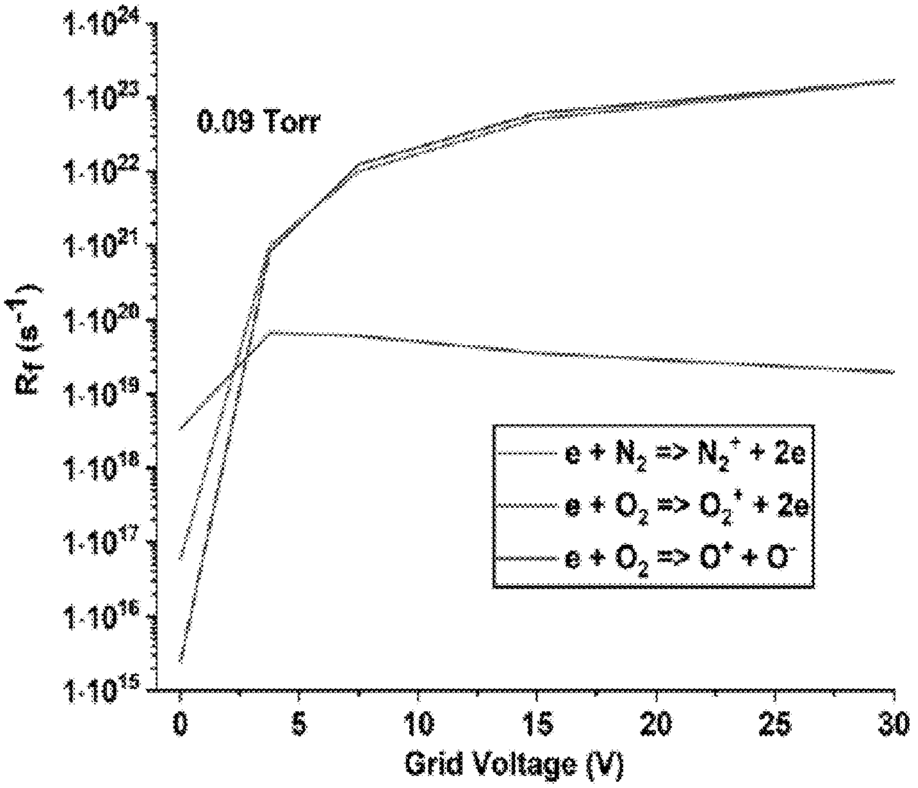

FIG. 19 shows the formation rate for $$N_2^+, O_2^+, \text{ and } O^-$$

vs. grid voltage at 0.07 Torr, FIG. 19A and 0.09 Torr, FIG. 19B.

Figure 20:
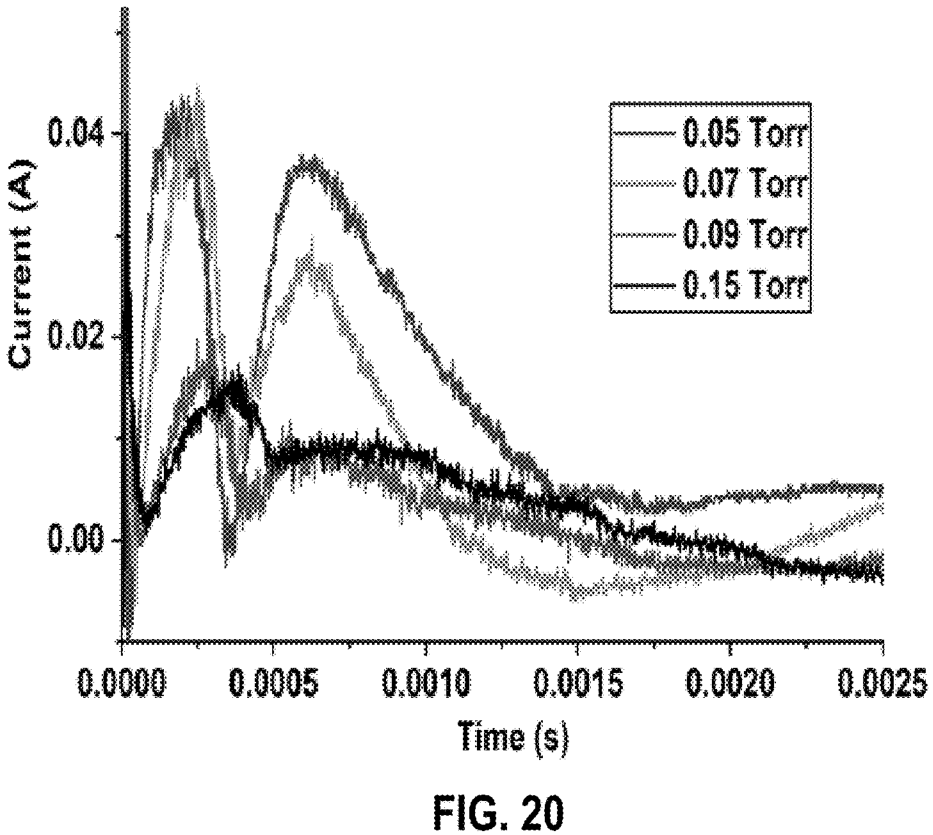

FIG. 20 shows current waveforms with pressure as a parameter.

Figure 21:
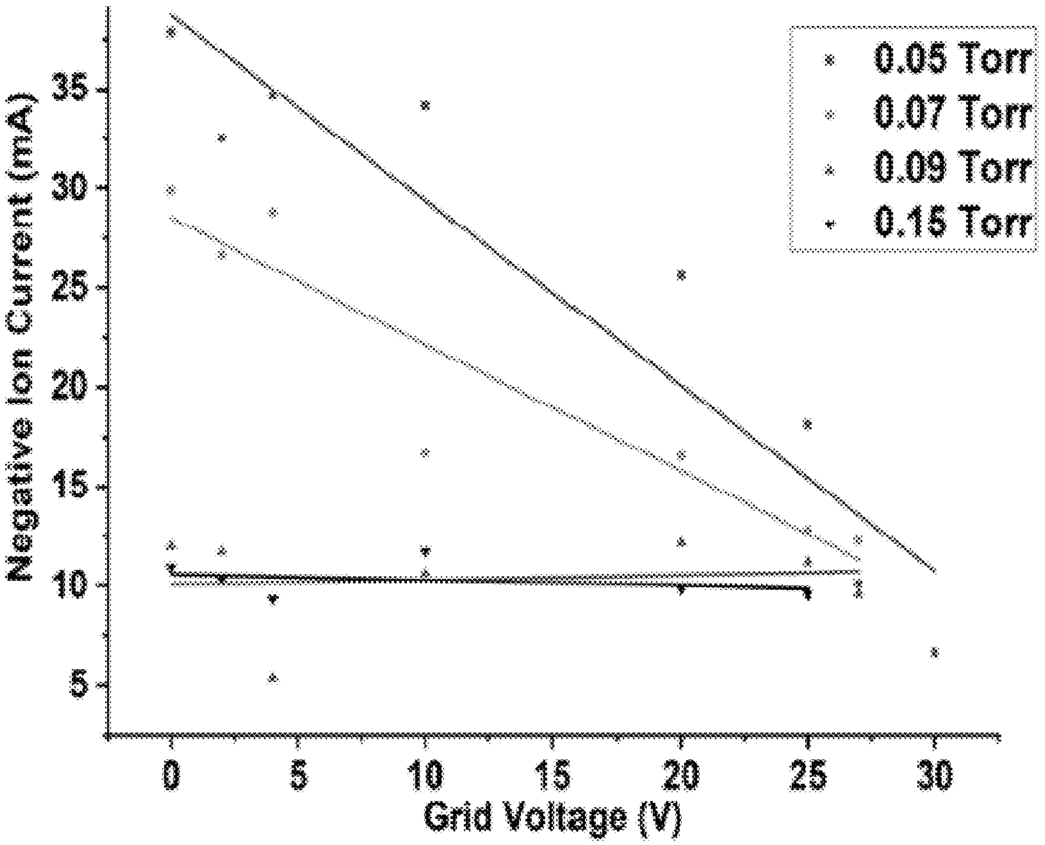

FIG. 21 shows a negative ion current peak as a function of grid voltage at different pressures.

DETAILED DESCRIPTION

In describing the preferred embodiments of the present disclosure illustrated in the drawings, specific terminology is resorted to for the sake of clarity. However, the present disclosure is not intended to be limited to the specific terms so selected, and it is to be understood that each specific term includes all technical equivalents that operate similarly to accomplish a similar purpose.

Typically, in ion engines, ions are accelerated by the electric field to create a thrust. To compensate for that positive charge typically a separate device called a neutralizer is used to produce electrons. In this invention, we are creating both positive and negative ions, thus eliminating the need for a neutralizer.

Embodiment A

Referring to FIGS. 1A, 1D, 1E, 1F are one example embodiment of the air-breathing plasma thruster (ABPT), and more particularly a self-neutralizing air-breathing electron plasma (EP) thruster (SABPT) 100 without SCOOP (i.e., without increasing air density), of the present disclosure, is shown. Here, the plasma thruster 100 has a thruster body or housing 101, support 102, entry electrode 104, electron source 106, magnet 110, and exit electrode 112. The housing 101 has a tube shape with an interior space that receives, encloses (radially, with open ends), and contains the support 102, entry electrode 104, electron source 106 (e.g., a cold atom electron source (CAES), magnet 110, and exit electrode 112. The support 102 can be a tube or other cylindrical or non-cylindrical member that has a central channel 103 with an entry side and an exit side. Air flows through channel 103 and enters the entry at the entry side of channel 103 and passes out the exit at the exit side of channel 103. Support 102 is inside the thruster housing 101 and coupled to the thruster housing 101. In certain embodiments, the thruster housing 101 can be the satellite body or housing.

The entry electron source 106, entry electrode 104, magnet 110, and exit electrode 112 are linearly arranged in that order, for example by being coupled to the support 102 at an outer surface of the support 102. The entry electron source 106, electrode 104, magnet 110*a* that form a magnetic field, and exit electrode 112 each have a ring shape and extend completely about the outer surface of the support 102. Though in other embodiments, the electron source 106, entry electrode 104, magnet 110*a*, and exit electrode 112 can each be formed by more than a single element, and for example, the entry electrode 104 can be formed of multiple discrete electrodes; the electron source 106 can be formed of multiple discrete electron sources; the magnet 110*a* can be formed of multiple discrete magnets; and/or the exit electrode 112 can be formed of multiple discrete exit electrodes.

The entry electrode 104 is coupled to support 102 toward or at the entry side of support 102, and the exit electrode 112 is coupled to support 102 toward or at the exit side of support 102. In the embodiment shown, the entry electrode 104 is coupled to the right of the electron source 106, and can optionally be partly contained inside channel 103 at the inner surface of the support 102. The magnet 110*a* is coupled to the right of the entry electrode 104, between the entry electrode 104 and the exit electrode 112. And the entry electrode 104 is between the electron source 106 and the magnet 110. The entry electrode 104 and magnet 110 are between the electron source 106 and the exit electrode 112.

Accordingly, as air flows through channel 103, it passes between the electron source 106, then the entry electrode 104, then the magnet 110*a*, then the exit electrode 112. In certain embodiments, the air flow can be provided by a blower that directs air into the entry. The electron source 106 creates the positive and negative electrons 108 that project into channel 103. The entry and exit electrodes 104, and 112 cooperate to ionize the air in channel 103. The magnets 110*a* create a magnetic field that projects into channel 103 and accelerates the ionized air to create thrust, which cancels out drag force to maintain the satellite in orbit. It is recognized that the magnets are in embodiments where the thruster is used in a satellite.

Figure 1A:
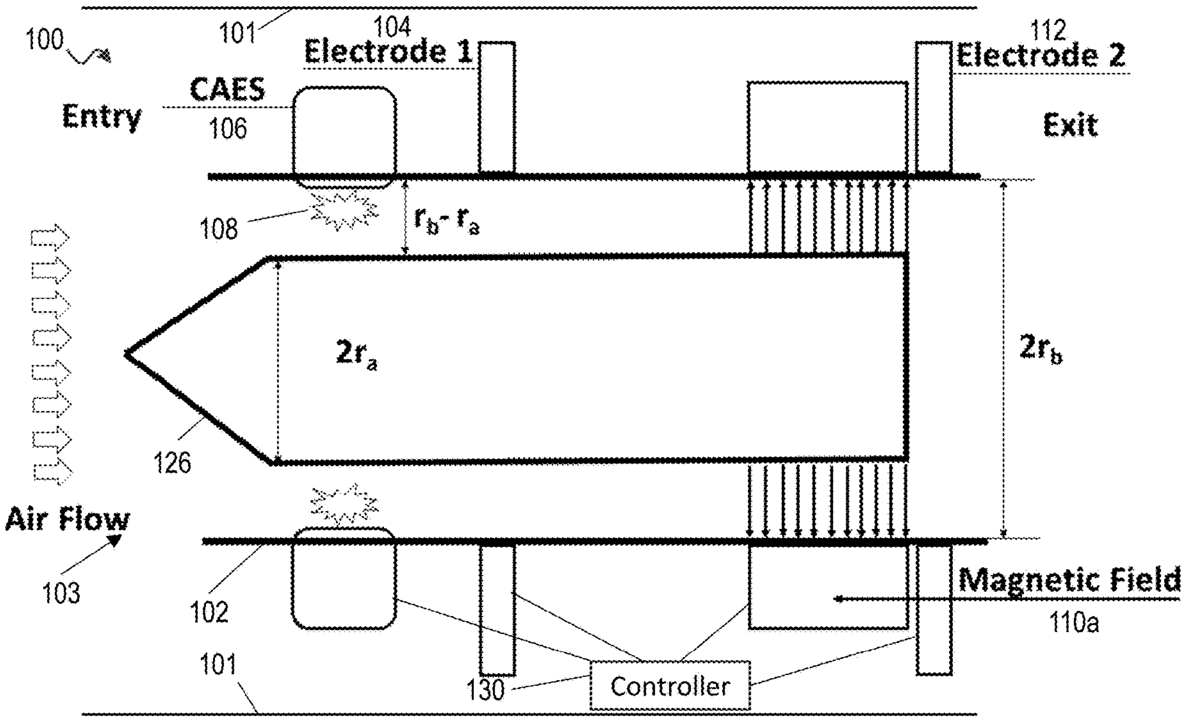
FIGS. 1A-1P are schematics of an ABPT that show the air inlet, ionization, and acceleration zone, where
Figure 1B:
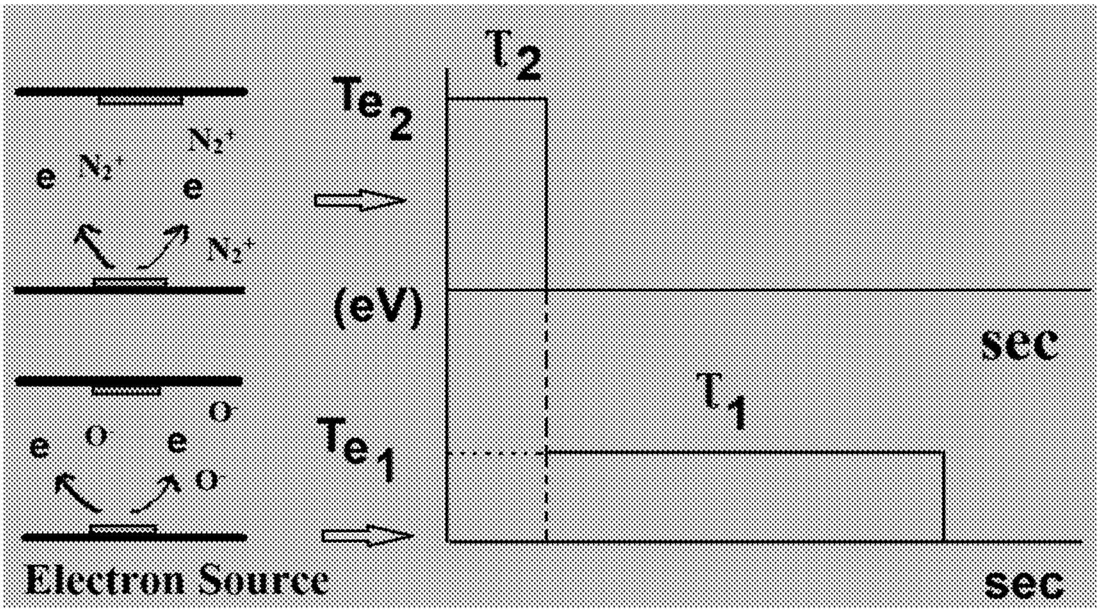
Figure 1C:
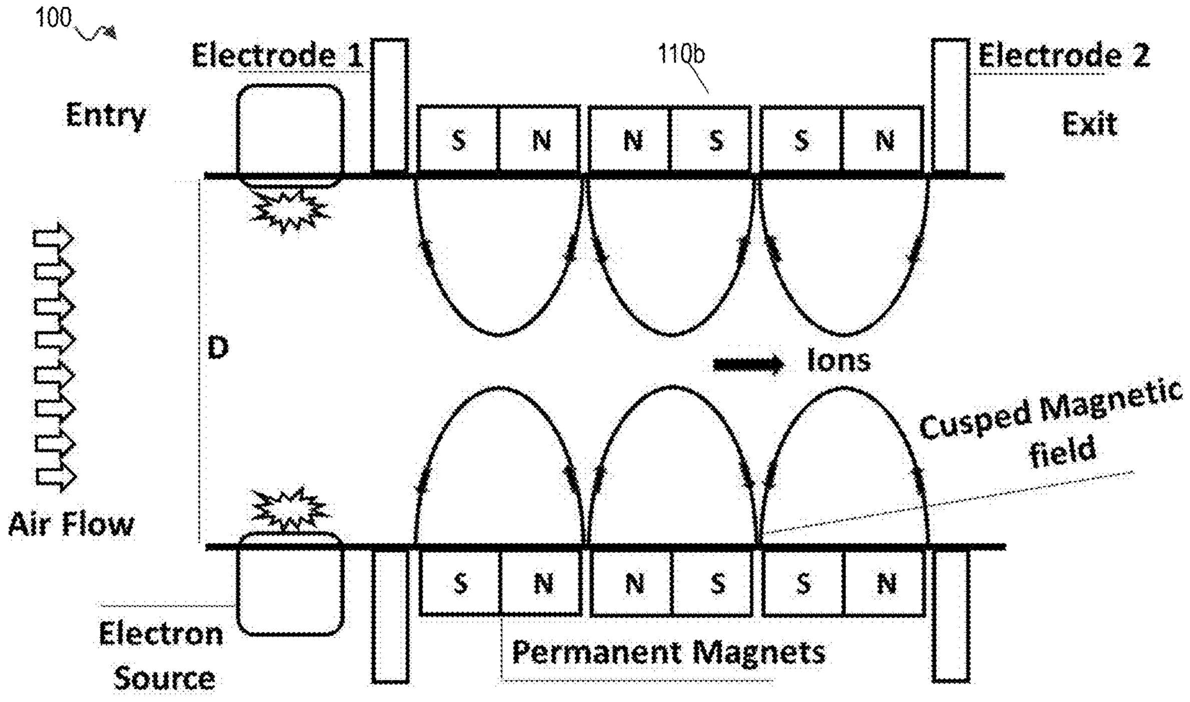
Figure 1D:
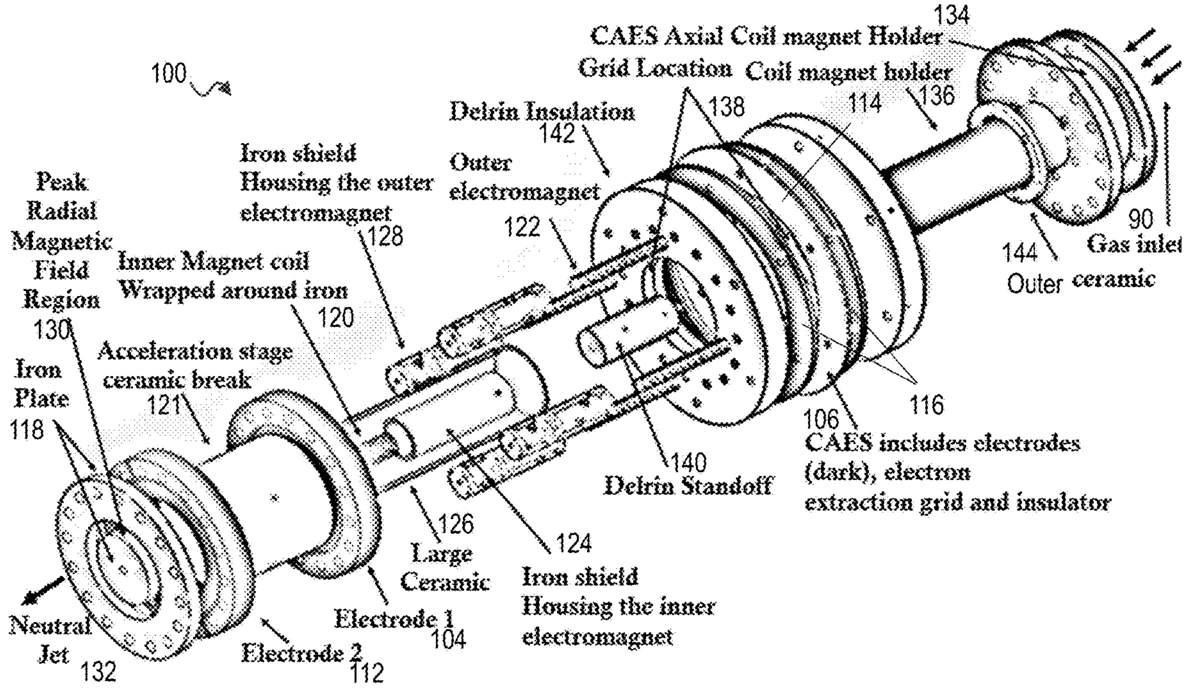
Figure 1E:
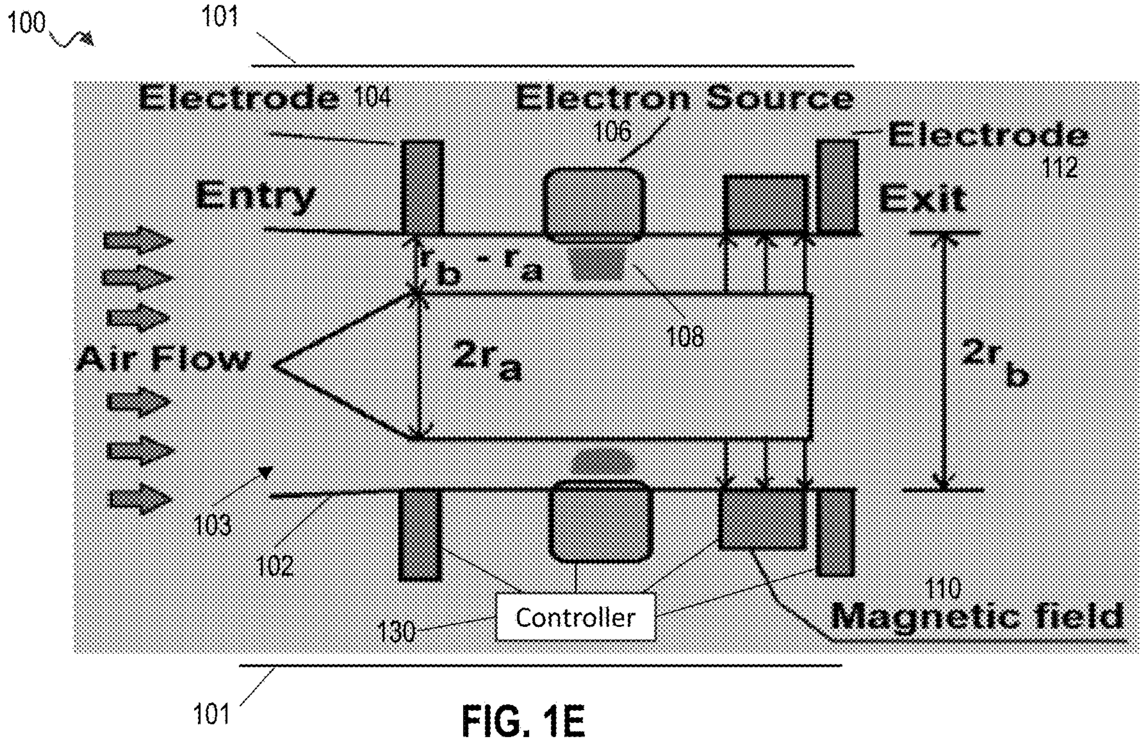
Figure 1F:
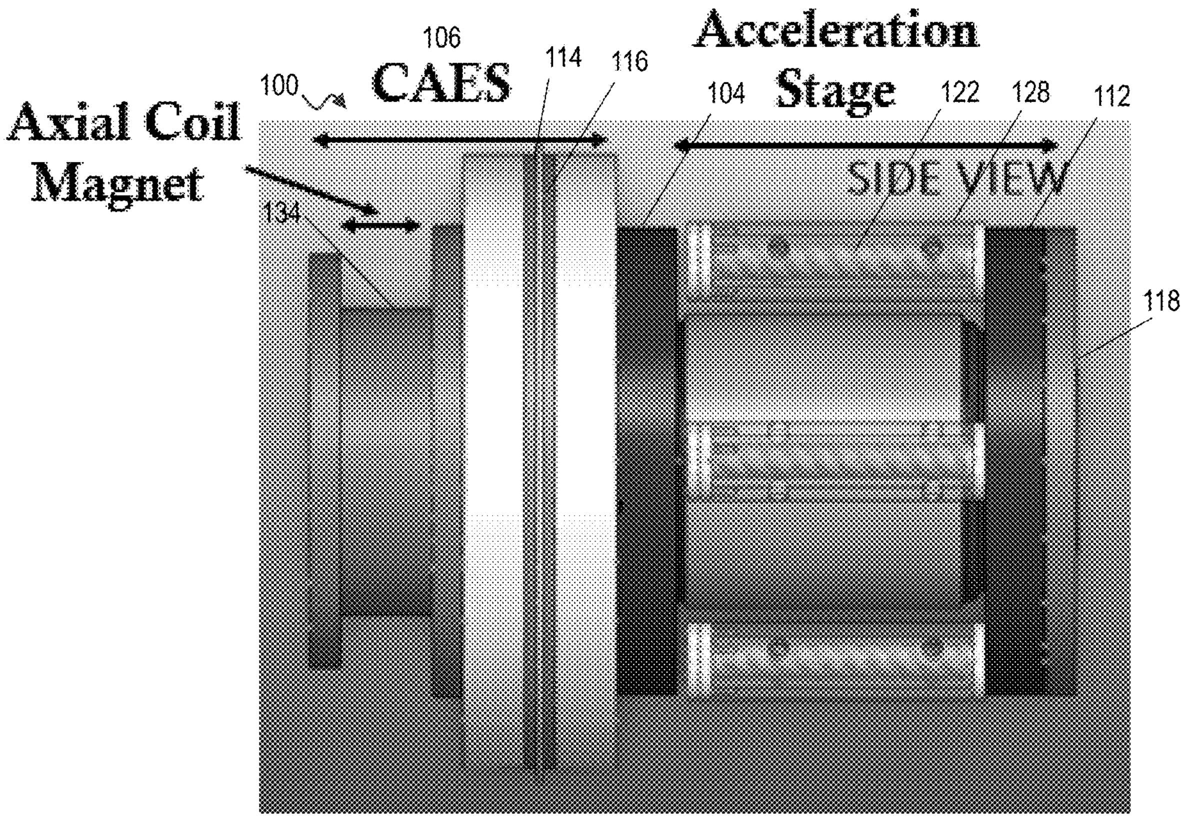

As shown in FIG. 1F, the thruster 100 has an electron source stage which includes the CAES 106, and an acceleration stage which includes the electrodes 104, 112, magnets 120, 122, and ceramic housing 126.

FIGS. 1C, 1G, 1H, 1I shows another embodiment of the disclosure. FIG. 1A shows an annual channel with a radial magnetic field in the acceleration region and a central magnetic rod 120; whereas FIG. 1C shows a cylindrical channel with a cusped magnetic field in the acceleration region and no central components (such as no central magnetic rod 120). The magnetic 110*b* is arranged as in FIG. 1A between the entry and exit electrodes 104, 112, but comprises one or more permanent magnets 110*b*.

FIGS. 1D, 1F shows the first embodiment of the SABPT. Here, the SABPT is a scramjet-type neutralizer-less ABPT configuration, where the incoming air is at a high speed that is not decelerated, unlike with a ramjet. This could eliminate the complexity of using a collimator (which increases the pressure and reduces the velocity) and reduces drag. A tunable energy circular arc electron source (e.g., FIG. 10A, 10B or a circular version, FIG. 1I) generates air plasma of incoming airflow in the SABPT 100 (FIGS. 1A, 1C) and an acceleration region, and has an electron source stage and acceleration stage (as in FIG. 1F). The ions generated are accelerated out of the thruster by alternating potential over the first electrode 104, while the second electrode 112 is grounded.

Figure 1G:
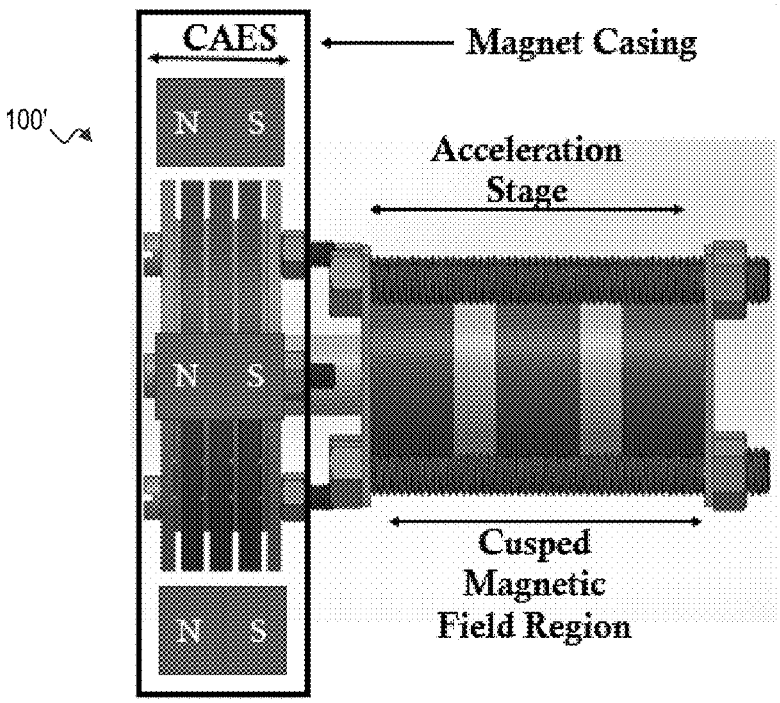
Figure 1H:
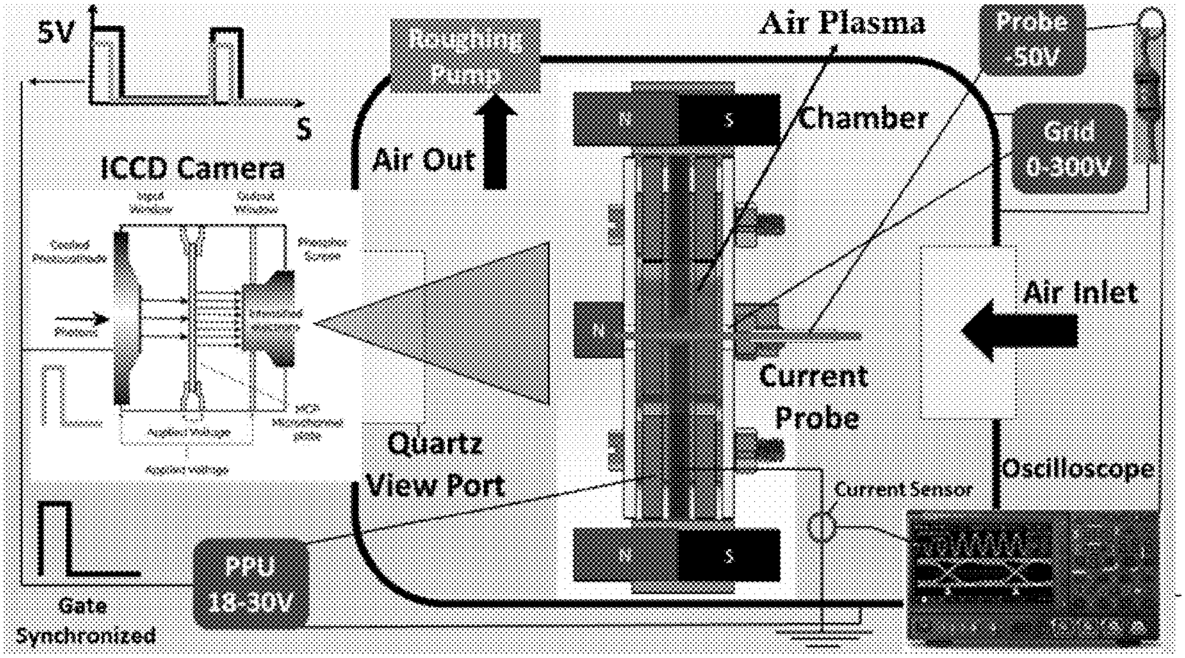

The radial magnetic field (FIGS. 1A, 1J) is applied between 1 large inner and one or more (here 4) outer iron-cored coil magnets, 120, 122. The inner iron-cored coil magnet 120 is a cylindrical rod that forms the innermost core. An iron shield housing 124 has the shape of a hollow tube with a central opening that receives and encloses (with open ends) the inner magnet coil rod 120. The shield 124 results in the magnetic field profile for SABPT as depicted in FIG. 1L. This prevents the escape of the magnetic field lines outside the thruster. A large ceramic tube housing 126 receives and encloses (with open ends) the iron shield 124. The large ceramic housing 126 covers the inner part of the coil magnet holder 136. The plasma generated in the engine can create losses when interacting with the coil magnet holder walls. Ceramic shields those walls to prevent losses. The inner magnet 120, iron shield housing 124, and ceramic tube housing 126 are concentrically arranged, with the iron shield 124 positioned between the inner rod 120 and the ceramic tube housing 126. The outer electromagnets 122 are arranged equidistantly about the ceramic housing 126. A separate tubular iron shield housing 128 has a central opening that receives and encloses (with open ends) each one of the outer electromagnets 122. The shield housing 128 is the outer iron shield similar to housing 124. This is made up of iron and a combination of the inner (large magnet) and outer 4 magnets (all of this covered with an iron shield/cylinder results in a magnetic field profile shown in FIG. 1K.

Figure 9:
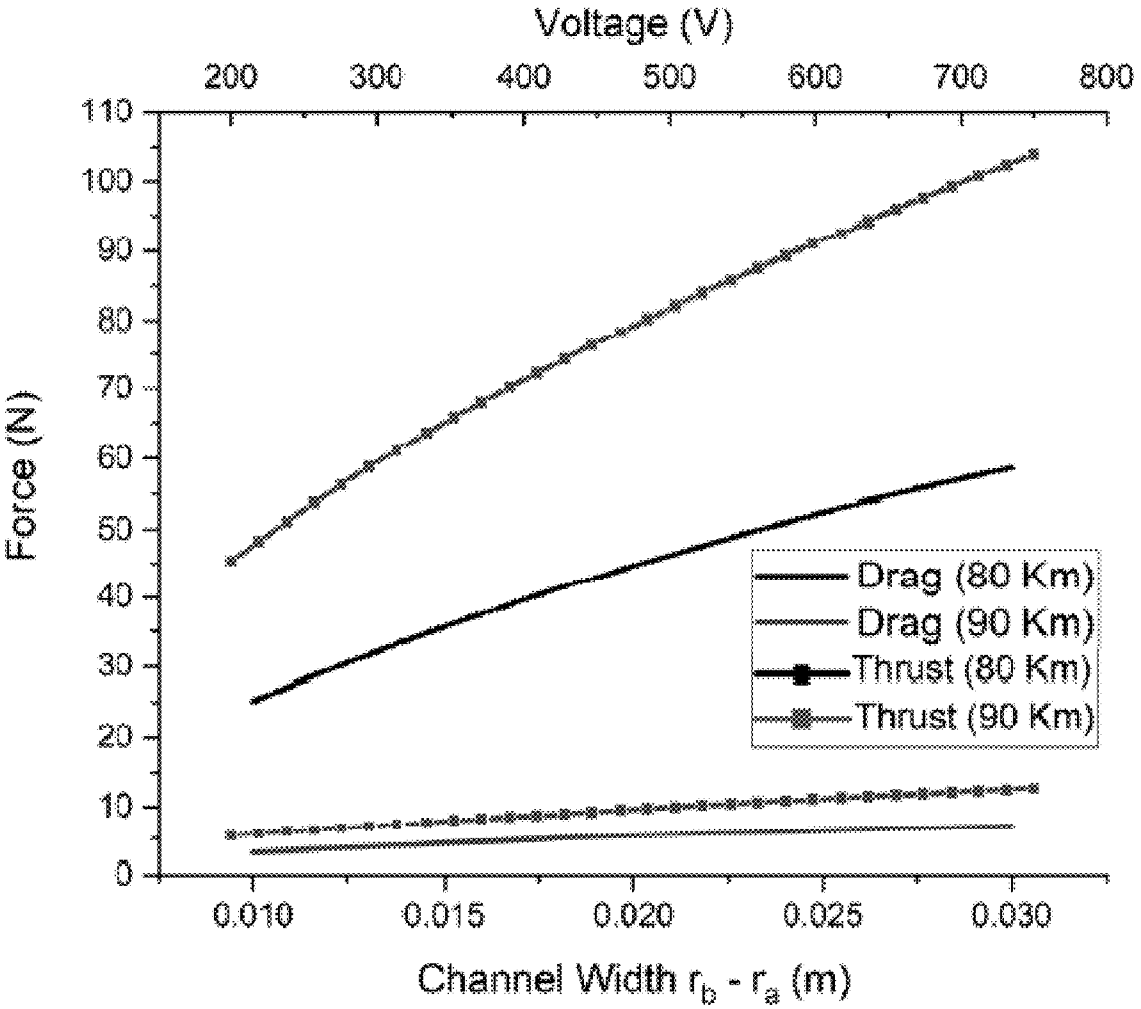
FIG. 9 shows the variation of drag force with the channel width ($r_b-r_a$) and time average thrust force variation with extraction voltage for 80 and 90 km altitude.

The ring-shaped thin iron plates 118 at the end of the thruster result in a peak radial magnetic field 110. In this region, the electrons from the air plasma, when extracted due to alternating potential over the electrodes are confined. The engine was designed based on the condition that re (electron Larmor radius)<Length of the thruster<ri (ion Larmor radius) to achieve electron confinement. In the first cycle, when the polarity over electrode 1 is negative (for instance −300V), positive ions are extracted. Simultaneously, for positive polarity over electrode 1, negative ions are removed. The extraction of the ions is due to E×B acceleration. The consecutive extraction of positive and negative ions resulted in a neutralized jet 132 at the exit of the SABPT 100 to produce thrust (FIG. 9; for 80 and 90 km, 45-105N and 5-11N). This thrust is compared with maximum drag in those altitudes shown in FIG. 9 appears to be much higher than drag.

As shown in FIGS. 1D, 1F, the SABPT has a gas inlet 101, where ambient air in a very low earth orbit enters the thruster. The CAES axial coil magnet generates a pulsed magnetic field for CAES and is housed and enclosed (with open ends) by a CAES axial coil magnet holder 134. A coil magnet holder 136 receives and encloses inner coil magnets (120 and supports a connection between the CAES 106 and the acceleration region. The coil magnet holder 136 is connected to the CAES 106 by bolting on 16 screw holes shown on coil magnet holder 134, CAES parts 106, and acceleration stage+Iron plate 118. An outer ceramic tube housing 144, and a large inner ceramic tube housing 126 prevents loss of plasma current to the walls of the coil magnet holder 136, 124. The walls of the coil magnet holder 136 and the cylindrical face to which it is connected (close to the outer ceramic housing 144). The ceramic housing 126 is received inside of the outer ceramic housing 144. The inner diameter of the outer ceramic housing 144 is larger than the outer diameter of the large ceramic housing 126.

Figure 1I:
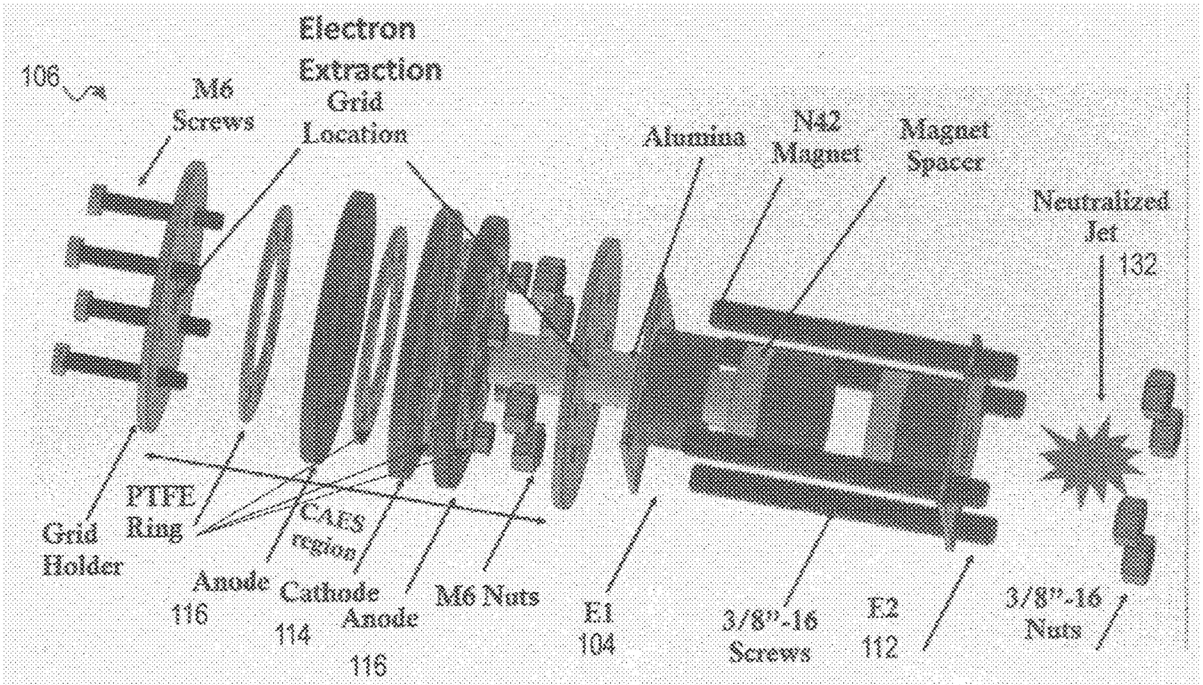

The CAES 106 is best shown in FIG. 1I, and includes 2 anodes, a cathode, 4 (PTFE) Teflon insulators, and an electron extraction grid. The anodes and cathodes are all ring shapes but have different designs. 4 PTFE rings: 2 rings are between anodes and cathode to create an insulation and arc interface between the electrodes. The remaining 2 are between the grid holder and anodes to prevent arcing due to surface barrier discharge between the grid and anode. Anode and Cathodes: High electric field is formed between them to generate an arc plasma. Electron extraction grid: Extracts electrons from the arc plasma and use them to ionize air molecules entering the thruster.

Figure 1J:
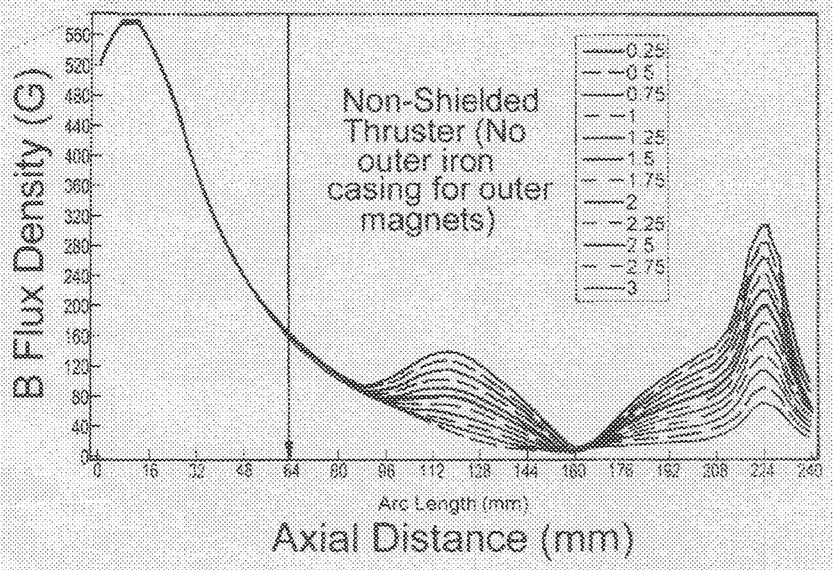
Figure 1K:
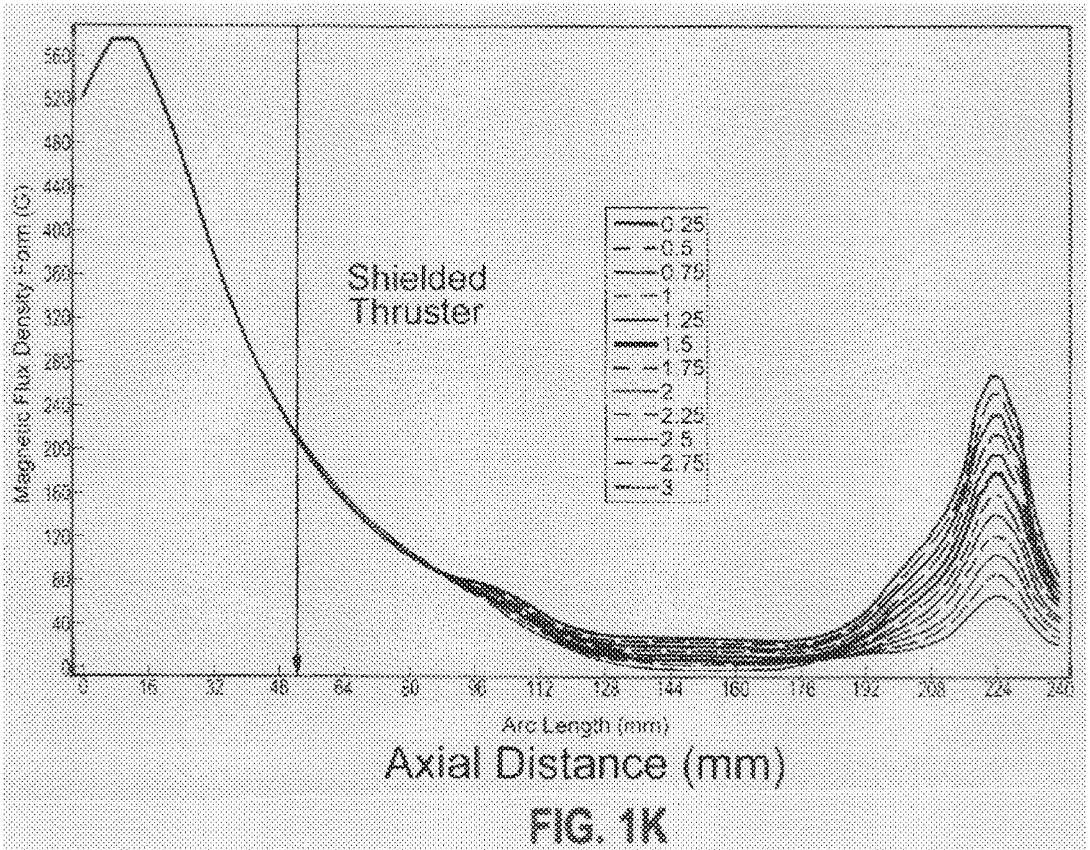
Figure 1L:
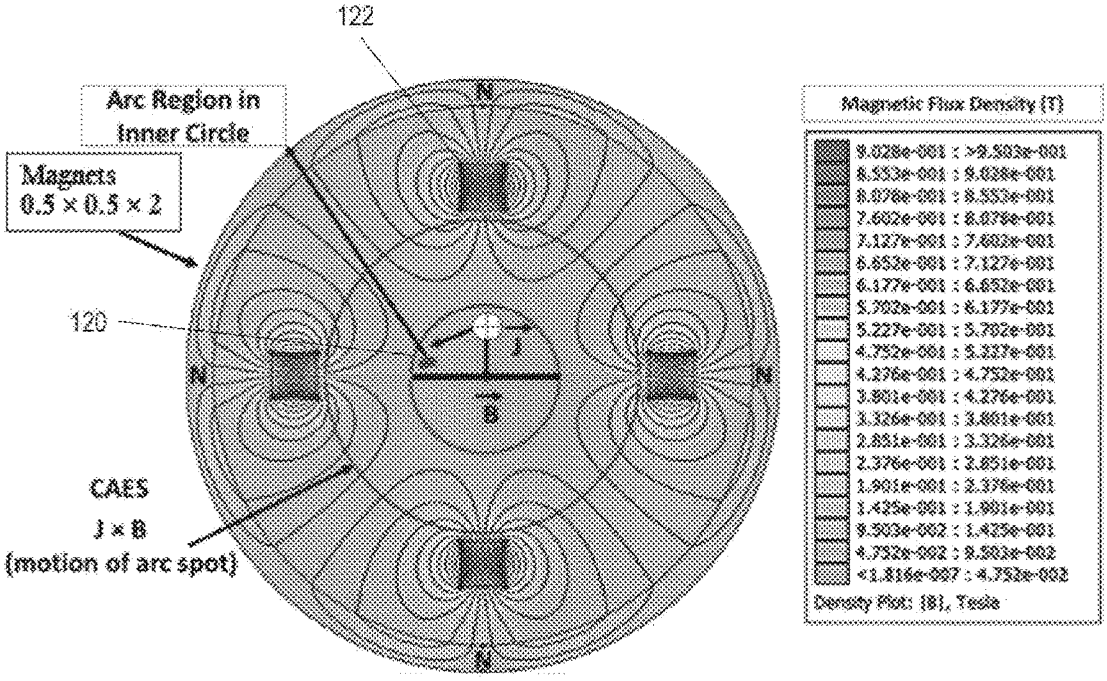

In both designs the electrodes are ring-shaped. In FIG. 1D, there are 2 anodes and 1, cathode (for creating are plasma due to high electric discharge between them), a Teflon insulator (arc occurs over this interface that creates insulation between cathode and anodes), 2 Delrin insulators (these are for structural support and holding the electron extraction grid) and electron extraction grid (this extracts electrons from the plasma created by arc discharge between electrodes). In FIG. 1I, there are 2 anodes and 1 cathode (for creating arc plasma due to high electric discharge between them), 4 Teflon insulators (2 Teflon rings between anodes and cathode arc occurs over this interface that creates insulation between cathode and anodes. The remaining Teflon rings are between anodes and Grid holder). The grid holder holds an electron extraction grid. A grid holder is coupled to a PTFE ring, which is then coupled to the first anode, which is coupled to the cathode, which is coupled to the second anode, which is coupled to a second grid. Thus, the anode/cathode/anode layer is positioned between the first and second grids. And there is a Teflon PTFE ring between them as well so grid/ring/anode/ring/cathode/ring/anode/ring/grid The CAES 106 is a combination of an are plasma generator and an electron extraction grid. The arc plasma generator is the arc plasma source which is everything except the grid. It creates metal ion plasma consisting of metal ions and electrons. The grid can be seen in FIG. 11. The grid extracts electrons from that metal ion plasma/arc plasma as we increase positive voltage/bias on the grid. A Delrin standoff 140 provides insulation between the iron inner core magnet and coil magnet holder. High current runs through the magnet. Delrin standoff creates insulation as the coil magnet holder is metallic and it can short circuit with the coil magnet. Also, the magnetic field profile shown would require it to have a certain standoff from the entry of the engine. An iron shield is formed by an inner magnet 120 and outer magnet 122 to prevent the escape of magnetic flux from core magnets as shown in FIGS. 1J, 1K). Magnets 120 and 122 are each a magnet coil wrapped around an iron core similar to the outer electromagnet to generate the magnetic field.

Housing 128 and housing 124 prevent the escape of flux. The electromagnet is housed inside them. The shields are made up of iron to prevent the escape of magnet flux. Iron has high permeability which means it has higher magnetic flux conductivity. An acceleration stage includes electrodes 104, 112, and alumina ceramic break 121 for ion extraction and prevention of current loss/secondary electron emission to/from the inner walls of the thruster. The ceramic break 121 is a hollow tube with open ends that receives and encloses the ceramic housing 126, inner magnet 120, iron shield housing 124, outer ceramic housing 144, and the standoff 140. Accordingly, the coil magnet holder 136 and outer ceramic housing 144 extend through the central opening of the CAES 106 (including the electrodes, electron extraction grid, and insulator), and into the acceleration stage ceramic break housing 121. The large ceramic housing 126 receives the coil magnet holder 136, which in turn receives iron shield housing 124, which receives the standoff 140 through one end of the iron shield housing 124, and the inner coil 120 through an opposite end of the iron shield housing 124. Of course, other suitable arrangements of the components are withing the spirit and scope of this disclosure.

As the insulation/walls between electrodes are ceramic aluminas and it is not metal, the ions that are extracted would not get lost to these walls as they are not conductive. Usually high-energy electrons/ions can interact with metallic walls and cause secondary electron emissions as well, which doesn't happen here. Iron plates are used to create peak radial magnetic field region 110 for electron confinement in the ion acceleration channel. A peak magnetic field region at the exit of the thruster is created. There are iron plates at the exit of the thruster that results in a magnetic field profile to shape as shown in FIG. 1J, that is the maximum at the exit of the thruster. Iron has high permeability and high magnetic field conductivity.

Figure 1M:
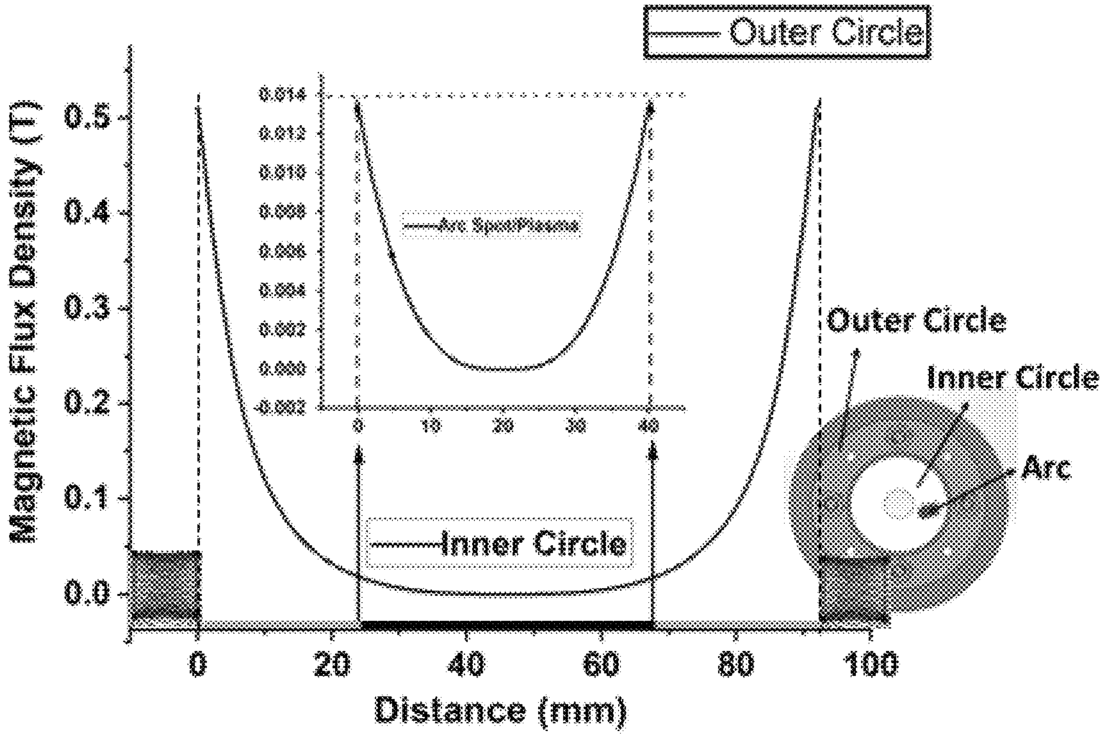
Figure 1N:
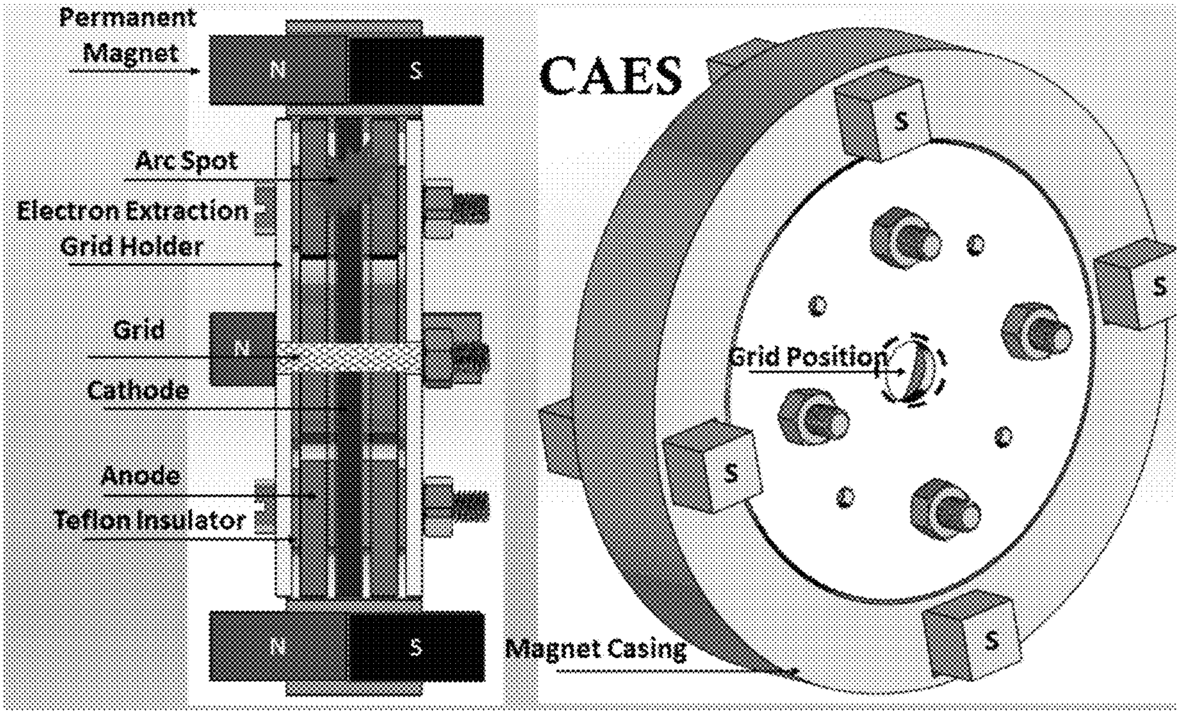

The electron grid 138 shape looks like the image in FIG. 1N. The Delrin insulation helps in structure support and holds the electron extraction grid. The CAES has shown in FIG. 1A is a simplified way to show CAES (that is described properly in FIG. 1D). The insulator is a ring located between the anode and cathode rings.

The magnetic field design is discussed in FIG. 1J, which shows the axial magnetic flux density profile for the SABPT 100. The peak field 110 near the exit of the thruster results in the confinement of electrons and electromagnetic acceleration of ions. The coil magnets with and without outer iron casings 124, and 128 were simulated. The shielded version shows the downfall of the magnetic field up-to the mid/upstream of the thruster. This prevents power loss towards the anode/grid of the CAES due to anomalous electron transport. The rise of the magnetic field upstream is due to the presence of an axial core coil magnet for CAES. The axial coil magnet leads to the forward motion of plasma downstream in the axial direction. This type of coil magnet is a pulsed magnet and can easily be integrated into the CAES similar to coaxial-AES. Any suitable circuit can be utilized to operate the CAES 106 (known as power-producing unit PPU), such as the controller 130.

Turning to FIG. 1G, another embodiment of the SABPT 100' is shown. Unlike the thruster 100 of FIGS. 1A, 1D, 1F, the thruster 100' of FIG. 1G includes a CAES 106 and a acceleration region, which can for example be a HEMP (highly efficient multi plasma) acceleration region. The thruster 100' operates with simultaneous E×B acceleration of positive and negative ions to achieve self-neutralization (due to the cancellation of charge densities at the exit). The electrons were confined in the cusped magnetic field in the acceleration region rather than primarily at the exit of the thruster (FIG. 1A). A longer region of acceleration and confinement results in the ability of the thruster to be operated at very high electric fields (the FIG. 1A design is Hall thruster based and limited to 300-1000V extraction potential). With the increase in magnetic field, higher extraction electric fields could be reached, hence greater acceleration of ions. FIG. 1A is a hall thruster-based design, typically acceleration potential values are limited due to losses. In the FIG. 1G design, we don't have that limitation. It also has to do with the magnetic field designs between both designs. In thruster 100, the peak hall-based magnetic field is seen at the end of the thruster whereas, for CAES 106, we have multiple peak magnetic field regions which prevent current losses due to electrons moving toward the anode (as electrodes are much more strongly confined in 106 design). The idea is that a higher magnetic field can maintain a higher electric field. Thus, higher ion energy can be achieved Systems 100, 100' require longer channels than conventional systems. A longer ionization channel is due to reduced pressure when air is used. The ionization channel length might be 30 cm to 1 m. Here we are ionizing air in our design. Air is majorly nitrogen that has a small ionization cross section and hence requires longer ionization lengths to completely ionize. The positive bias on the grid results in the radial extraction of electrons from the arc plasma, unlike coaxial AES (axial motion of electrons). The increment of mean electron energy is directly proportional to the increase in the bias. The high and low energy operation would result in the formation of positive and negative ions. The ionization rate (electron density/neutral density) improves with the grid voltage (mean electron energy). Simultaneously, at lower energies (less than 4 V), O— ion density is more substantial than positive charge density as the attachment reaction dominates the ionization rate coefficient. Again, the thruster system 100' (like thruster 100) is a neutralizer-less design with an arc-based electron source. A typical electron source (hollow cathode) would require a vacuum background, a thermionic emitter heating system, and a separate propellant tank for its application. Interestingly, CAES 100, 100' do not require those systems. Most importantly, CAES can efficiently operate in the medium pressure range ($10^{-4}$ Torr-$10^{1}$ Torr). The main objective is to use negative ions and positive ions created in the air ionization process using CAES leading to an extracted neutralized beam at the exit of SABPT.

Parts of the SABPT V1: CAES (grid holder holds electron extraction grid, 2 anodes, 1 cathode, and 3 Teflon insulator rings), magnet casing (shown in slide 6, holds permanent N42 bar magnets), ceramic (prevents current loss and heating of magnets), 3 N42 ring magnets (to create a cusped magnetic field for electron confinement as shown in FIGS. 1F, 1G), E1 and E2 (ion extraction electrodes with E1 set to alternating potential and E2 grounded). FIG. 1N shows the design of the grid (FIG. 1P), location, arc plasma generator, and how air plasma looks.

Figure 1O:
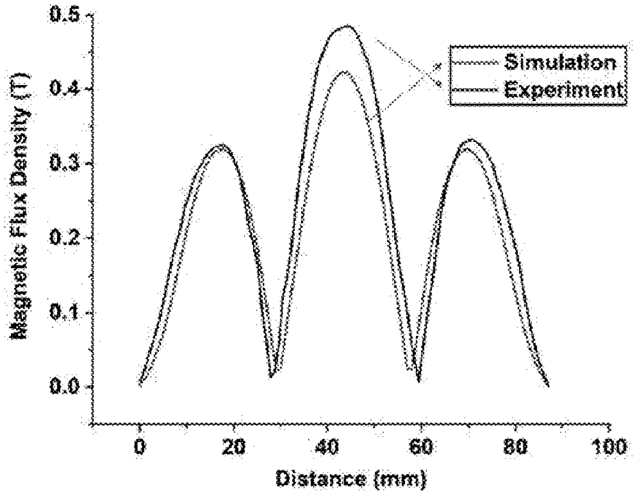
Figure 1P:
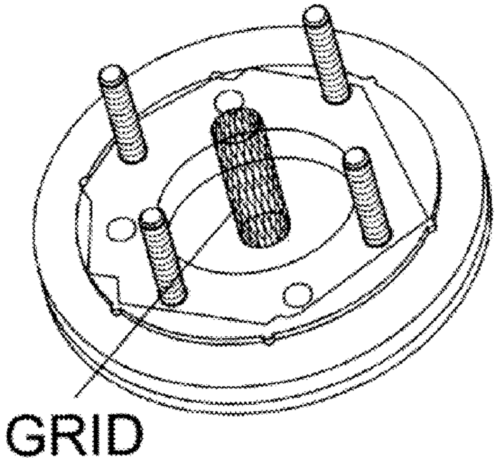

Referring to FIGS. 1L, 1M, the magnetic field design is shown for the inner rod magnet 120 and the outer magnets 122, namely the four N42 magnets 122. This figure shows the magnetic field profile for CAES only (FIG. 1G front view except for the acceleration stage). The inner magnet 120 is the inner circle (interface where the arc spot is generated). The outer magnet 122 is the permanent magnet that was used to generate the radial magnetic field of CAES. The magnetic field was generated for the acceleration region (using ring magnets) and CAES (using bar magnets). Both sections use N42 permanent magnets. The magnetic field design can be observed in FIGS. 1L, 1M, 1O. The 4 N42 CAES magnets 122 are arranged such that the resultant magnetic field would be normal to the current direction, and in the example embodiment shown the magnets 122 are spaced 90 degrees apart. FIG. 1L shows the magnetic field contour for CAES design in FIG. 1I. FIG. 1M shows the magnetic flux density profile for CAES design in FIG. 1I. And FIG. 1O shows the Cusped Magnetic field profile for CAES's acceleration stage of FIG. 1I.

This would cause cathode spots formed by CAES to rotate and spread in the J×B direction. About 8 magnetic field contours were formed by using N-poled magnets at 90 degrees from each other. The magnetic flux density at the arc spot interface was about 0.014 T. The acceleration region of SABPT 100' operates with 3 permanent ring magnets configuration. The magnets generate 3 peak cusp regions of the magnetic field. This type of magnetic field configuration prohibits electrons from hitting the walls, hence preventing wall erosions. In the SABPT 100, electrons may interact with the walls at the exit of the thruster. The magnetic field in this case prevents electrons from reaching walls, reducing losses. High magnetic fields are used in these types of engines/thrusters to confine electrons. As thruster is primarily generated by ions (as ions are heavier than electrons), so we use the magnetic field to confine them. The magnetic field also results in the acceleration of ions due to Lorentz force which is E×B acceleration.

The ability to operate by in situ air propellant ionization creates advantages such as low launch cost and increased payload capacity of the rockets. Additional superiority over existing plasma thruster designs is due to intensified satellite mission capabilities such as earth imaging, reduction of the number of pollutants released in the atmosphere, and ability to untie the link between the stored propellant and lifetime, and the prevention of space debris formation. However, challenges such as drag more than thrust induced due to collimator air inlet design exorbitant power requirements, and methods to enhance ionization need to be addressed. For very low earth orbit, missions such as low earth imaging, low-cost synthetic aperture radar, lidar missions, telecom-based missions for reduced communication windows, GIS, and Solar irradiance data collection missions can be performed using a SABPT based propulsion system in a sun-synchronous dusk dawn orbit.

It is further noted that, in other embodiments, for example as shown in FIG. 1E, other orders of components can be provided, for example, the electron source 106 can be placed after (i.e., to the right of, in the embodiment shown) the entry electrode 104.

*****

It is crucial to study air ionization in detail as it affects the thrust, power, ionization layer length, and efficiency. Additionally, different processes to enhance ionization should be explored. Another essential requirement for the operation of an HET-type accelerator is the neutralization of extracted ion flux utilizing a hollow cathode. However, hollow cathode operation requires propellant, albeit it needs a relatively low flow rate. Nevertheless, to avoid propellant storage, one needs to consider potential self-neutralizing solutions.

In the present disclosure, we present chemical kinetics plasma simulation results for the low-pressure air ionization process. We also highlight the evolution of respective species densities concerning mean input electron energy at different altitudes. At the same time, based on air ionization analysis, we assess the possibility of a neutralizer-free concept for ABPT. It will be shown that there is a potential to achieve self-neutralization by operating in a high-low electron energy mode operation. The ions generated inside the thruster could be extracted using electrodes with alternating potential (based on the ion charge to extract, FIG. 1A. As a result, the charge densities are canceled out. The thruster performance calculations based on the simulation and design results were performed, supporting the possibility of this thruster being used for drag compensation.

Air-Breathing Electric Engine Chemical Reaction Simulation

The primary focus of the present disclosure is air ionization using detailed plasma chemistry. The present disclosure also teaches that it is possible to modulate positive and negative ions extraction and provide neutralization without an external neutralizer. Below we describe such a self-neutralizing ABPT device (SABPT). The ABPT schematics without an external neutralizer are shown in FIGS. 1A, 1E is proposed to simplify the existing air-breathing electric engine designs. A traditionally used cathode neutralizer requires additional gas flow to produce electrons for neutralization. This consumes additional power and adds extra complexity. Air consists of oxygen that creates negative ions, creates neutralization (with positive ions), and provides additional thrust for ABPT.

Given this, the main goal is to utilize these negative ions and positive ions to create a neutralized beam at the exit of ABPT, thereby eliminating an external cathode neutralizer requirement. The main advantage of a purely air-breathing propulsion approach is the complete absence of the additional propellant requirement. The formation of positive and negative ions is controlled by electron energy. Electrons are injected along the channel by electron sources marked in FIGS. 1A, 1E. The aim is to achieve neutralization by producing positive and negative ions. To achieve this, both negative and positive ions will be extracted by appropriate arrangement of electric field and by switching the polarity of electrodes as shown in FIGS. 1A, 1E. To this end, HET type of acceleration can be utilized, and as such electric field will be localized in the region of a magnetic field as shown in FIGS. 1A, 1E. For example, positive ions are extracted when the electrodes at entry and exit of the ABPT are biased positive and negative respectively. To achieve neutralization, negative ions are extracted by flipping the polarity of the electrodes such that the charge densities are canceled out. The operation time for extraction is obtained from our simulation results. Within the magnetized area, electrons are confined while both positive and negative ions are not magnetized and, as such, will be accelerated along the axial electric field. The extraction of negative ions from magnetized plasma is widely utilized in negative ion sources. The magnetic field selected for our model (typical for Hall thrusters) is in the range of 50-300 Gauss, based on obtained results for 80-90 km from the authors' work, such that only electrons are magnetized. When positive ions are extracted, the potential downstream will reduce, whereas it would increase in negative ion extraction. With the current designs in ABPT engine propulsion, it is crucial to understand the processes involved and control parameters. The chemical reactions involving numerous species and their respective reactions lead to ionization when energetic electrons are supplied inside the ABPT engine. The mean electron energy was the key to allowing control over the chemical reaction rates.

In the present disclosure, plasma chemistry simulation was conducted by solving a differential equation (equation 1), progressing to a total time of 0.125 milliseconds. The simulation time is decided to assume an orbital speed of 8 km/s and a maximum chamber length of about 1 m. FIGS. 1A, 1E shows that the total simulation time was considered based on incoming air velocity entering the ABPT engine. Schematically electron sources are also shown in the figure. It is assumed that the electron energy is controlled by the electron sources distributed along the ionization region of the channel for simplicity. The energy of the electron source is tailored to produce negative and positive ions as shown in FIG. 1B. The electron source is distributed uniformly along the channel to maintain a uniform temperature distribution. In the acceleration region (i.e. magnetized area), the electron temperature is controlled by the applied voltage. The maximum electron temperature is typically about 10% of the discharge voltage, which is 30 eV in our case.

TABLE 1

Neutral Densities $m^{-3}$ obtained using MSIS-E-90 Atmosphere Model Jan. 1, 2020 at 1.50 Hr. Lat. 38.91, Long. 77.04, step size 5.00 km.

| Height (km) | M Density ($m^{-3}$) | $N_2$ ($m^{-3}$) | $O_2$ ($m^{-3}$) | N ($m^{-3}$) | O ($m^{-3}$) |
|---|---|---|---|---|---|
| 80 | $5.70 \times 10^{20}$ | $5.00 \times 10^{20}$ | $7.00 \times 10^{19}$ | $4.63 \times 10^{10}$ | $4.40 \times 10^{15}$ |
| 90 | $6.97 \times 10^{19}$ | $5.50 \times 10^{19}$ | $1.45 \times 10^{19}$ | $2.83 \times 10^{10}$ | $2.40 \times 10^{17}$ |
| 100 | $1.16 \times 10^{19}$ | $9.00 \times 10^{18}$ | $2.17 \times 10^{18}$ | $1.64 \times 10^{11}$ | $4.40 \times 10^{17}$ |
| 110 | $1.68 \times 10^{18}$ | $1.24 \times 10^{18}$ | $2.46 \times 10^{17}$ | $2.50 \times 10^{11}$ | $1.93 \times 10^{17}$ |

Chemical Composition Calculation

The reaction rate equation was used to calculate updated densities of reaction species with mean electron energy ranging from 0-200 eV. The simplified reaction rate equation used is shown below:

$$\frac{dn_a}{dt} = \sum_b k_b(T_e, T_g) \prod_c n_{b,c} \tag{1}$$

In the above reaction equation, $n_a$ stands for the $a^{th}$ species density ($m^{-3}$), $k_b$ is the $b^{th}$ reaction rate coefficient (it is a function of electron temperature $T_e$ and the gas temperature $T_g$, $m^3/s$), and $n_{b,c}$ is the $c^{th}$ reactant density in the $b^{th}$ reaction. A total of 167 chemical reactions occurs between $N_2$ and $O_2$, as shown in Appendix Table II of Anmol Taploo, Li Lin, Michael Keidar; Analysis of ionization in air-breathing plasma thruster. Physics of Plasmas 1 Sep. 2021; 28 (9): 093505. table II. The initial densities were selected based on the air number density in the altitude range of 80-110 km. The gas temperature is the ambient temperature of the air at the altitudes of 80, 90, 100, and 110 km.[14] The M species is the total neutral density that was the sum of the density of O, N, $N_2$, and $O_2$, as shown in Table I. For 80, 90, 100, and 110 km altitudes the densities selected were $5.70\times10^{20}$, $6.97\times10^{19}$, $1.16\times10^{19}$ and $1.68\times10^{18}$ $m^{-3}$ in all the calculations. These densities were obtained from MSIS-E-90 Atmosphere Model[14] using the coordinates of Washington DC, USA. The reaction rates not in the database were calculated (by computing the electron energy distribution function with the Boltzmann equation) utilizing the cross-sections obtained from the LXCat database.

Pulsed Simulation to Control Positive and Negative Ion Production. Bimodal Operation of Abpt.

In this section, the electron energy will be sweeping in the form of a high and low-energy pulse, as shown in FIG. 1B. The schematic of the pulse wave used in the simulation is shown in FIG. 1B. Due to the energy difference for ionization and attachment processes shown in FIG. 2, the alternation of low and high-energy modes produced self-neutralized plasma after extraction without a cathode neutralizer. In FIG. 1B, the schematic of positive and negative ion production can be seen. A combination of the longer and shorter pulse would be required to produce negative ions and positive ions. This is because positive ion density is much higher than that of negative ions inside the engine, as shown below. Pulses of different $\mathcal{T}_1$ (pulse width low energy), $\mathcal{T}_2$ (pulse width high energy), frequency, and amplitudes were simulated. The objective of this simulation was to maximize negative ion density such that cumulative charge densities would cancel out after extraction. In this case, a self-neutralizing thruster can be realized. This concept can provide the potential for neutralizer-free thruster operation, as illustrated later in the present disclosure. Typically, the cathode source neutralizes the ion beam escaping the plasma engine by adding a negative charge through electron emission. Modulating low (higher duration) and high energy (low duration) can provide self-neutralizing conditions after extraction.

Figure 2:
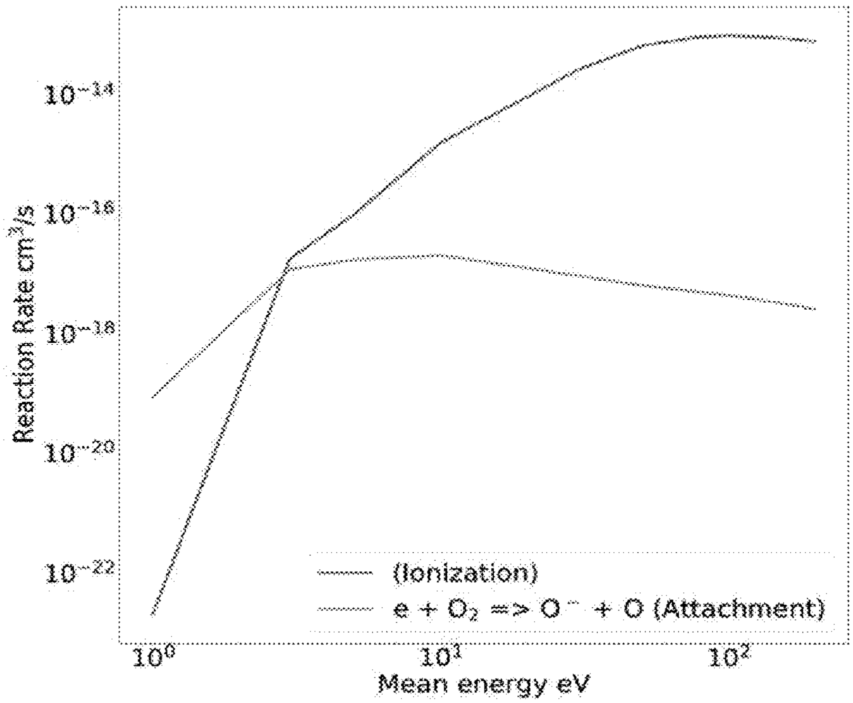
FIG. 2 is a plot that shows ionization and attachment reaction rates variation with mean electron energy.

As shown in FIG. 2, it can be viewed that for lower energies, negative ion formation occurs due to electron attachment reactions because their attachment rates dominate (especially dissociative attachment reaction of oxygen $e+O_2 \Rightarrow O^- + O$).

Results

In this section, the results of air ionization have been analyzed. Firstly, the plasma simulation involved studying the evolution of species with increments in mean electron energy. Secondly, the self-neutralization in an ABPT is proposed and simulated. Lastly, the ABPT performance parameters were calculated using the obtained results.

Air Ionization Simulation

For performing plasma simulation for low-pressure air, the database includes all the reactions mentioned in Appendix Table II. For higher mean electron energy, the simulation results do not change. The electron sources added electron density based on mean electron energy to the system. Due to different chemical reactions such as ionization, electron detachments, and ion-neutral collisions, there was an increase in the electron density in the system. The variation of electron density with mean electron energy can also be observed in FIG. 3 demonstrating electron density growth as a function of mean electron energy.

The simulation time was set by assigning the engine length as 1 m at the flight speed of 8 km/s. The simulations showed that for 100 and 110 km altitude, the simulation required more than 1 m ionization chamber length (0.125 ms total simulation time) to ionize air fully (reach 100% ionization rate). The proposed scramjet-type thruster is efficient if the air is highly ionized. It takes more time due to less air density and a higher mean free path. This also explains why long channel engine length at higher altitudes is required for ionization to reach its peak. According to Romano et al. altitudes above 120 km in VLEO for engine length in the range of 0.3-3 m, the engine would experience free molecular flow. The region beyond this altitude is considered a free molecular flow region. With the height increment, the mean free path between molecules increases, and the particles will travel longer distances to collide with another particle, thus decreasing the collision frequency. The high mean free path effects can be viewed in our results. Initially, our simulation peaked in ionization values for 80 and 90 km altitudes in mean electron energy value of 30 eV and less. For 100 km altitude, it reaches maximum values around 100 eV. There is not much ionization degree surge for 110 km altitude (transition region), as the simulation's total time is limited to 0.125 ms.

Figure 3A:
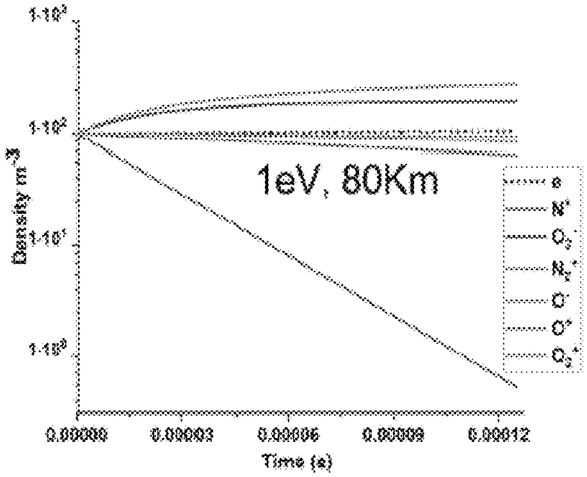
FIGS. 3A, 3B, 3C, 3D, 3E, 3F and 3G refer to 1, 3, 5, 6, 8, 10, and 30 eV ions plots. The FIGS. 3H and 3I refer to 10 and 30 eV neutrals plots. The neutral density for 80 km used was $5.70\times10^{20}$ $m^{-3}$. The channel width and the length of the chamber are 0.03 and 1 m.
Figure 3B:
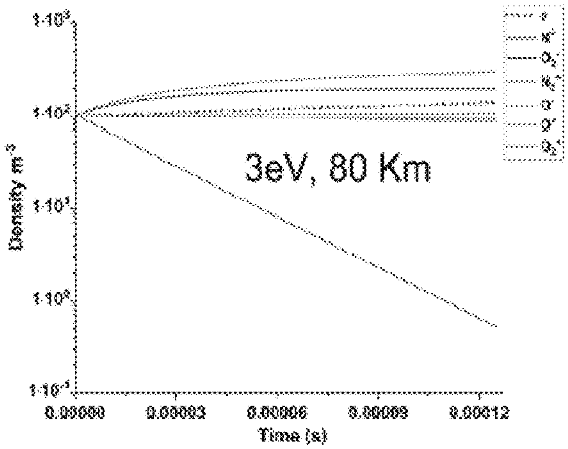
Figure 3C:
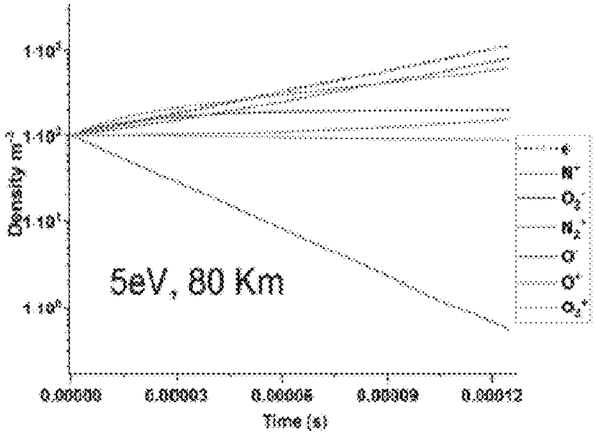
Figure 3D:
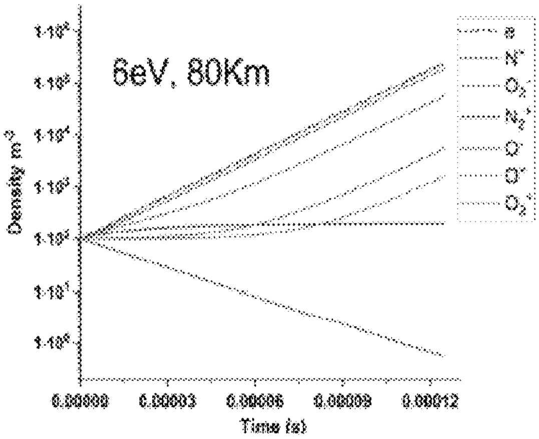
Figure 3E:
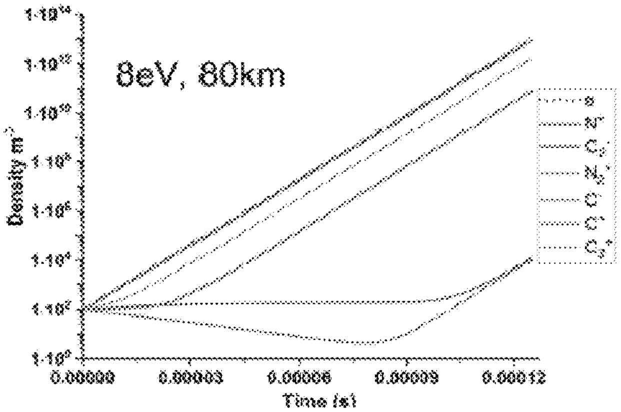
Figure 3F:
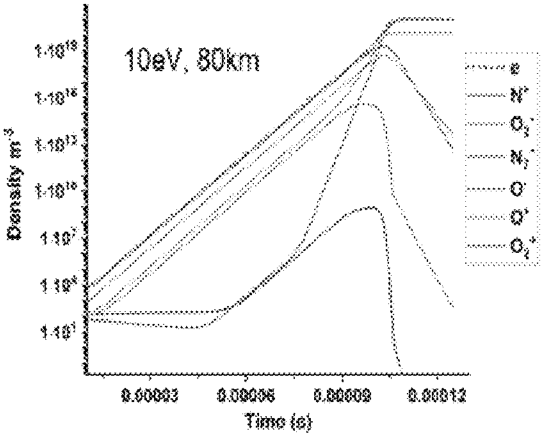
Figure 3G:
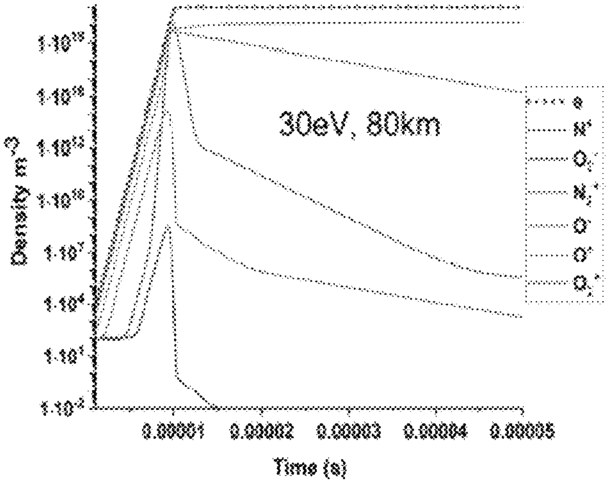
Figure 3H:
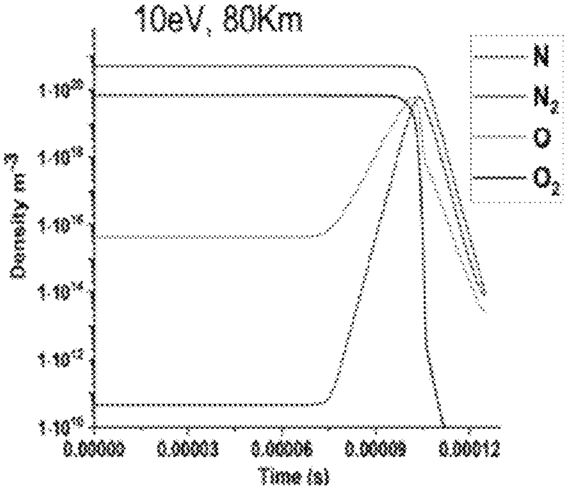
FIG. 3 shows variations of electron, ions ($N^+$, $O_2^-$, $N_2^+$, $O^-$, $O^+$ and $O_2^+$) and neutral species (N, $N_2$, O, and $O_2$) number densities with time for different mean electron energies (1-30 eV). This was performed at an 80 km altitude.
Figure 3I:
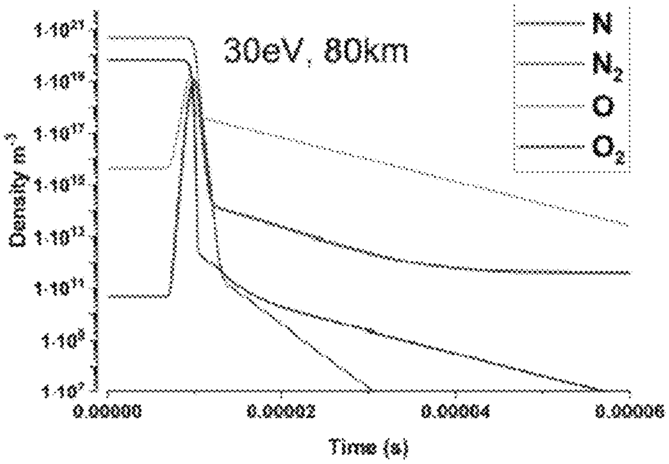
Figure 4A:
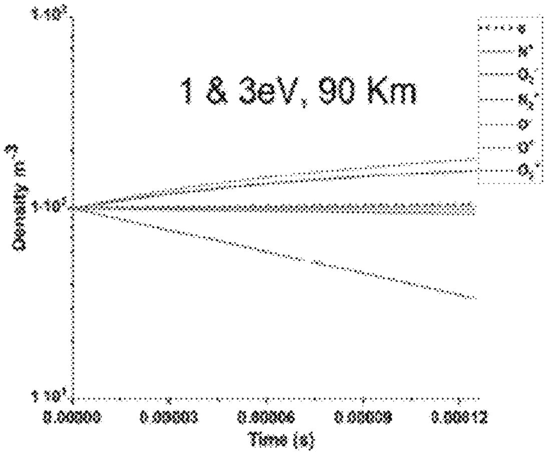
FIGS. 4A, 4B, 4C, 4D, 4E, 4F and 4G refer to 1-3, 5, 10, 15, 20, 25, and 30 eV ions plots. The FIGS. 4H, 4I, and 4J refer to 20, 25, and 30 eV neutrals plots. The neutral density for 90 km used was $6.97\times10^{19}$ $m^{-3}$. The channel width and the length of the chamber is 0.03 and 1 m.
Figure 4B:
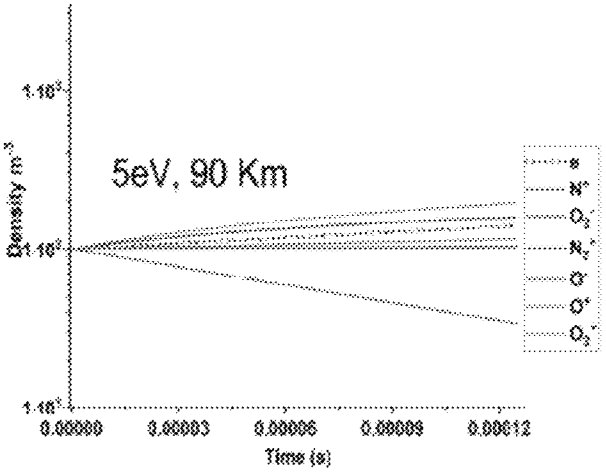
Figure 4C:
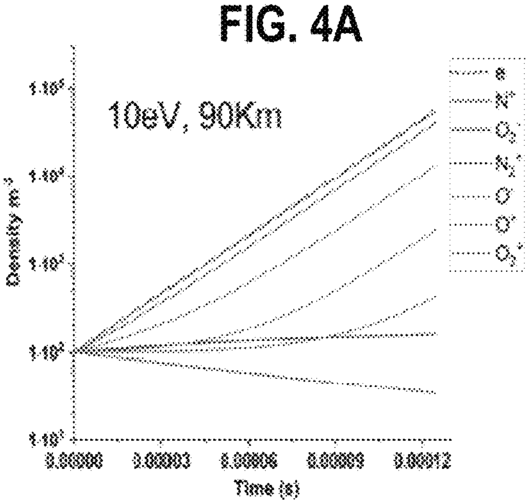
Figure 4D:
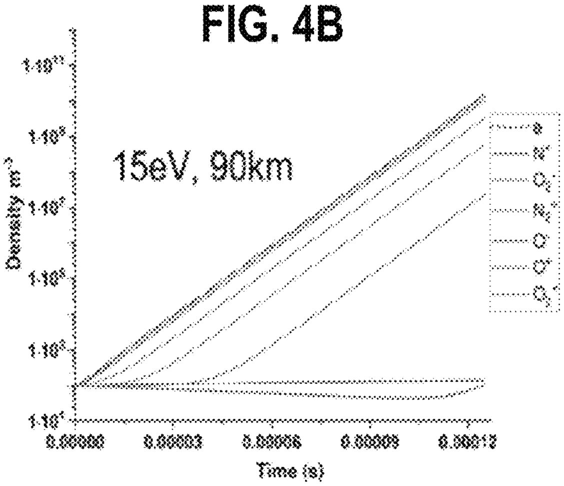
Figure 4E:
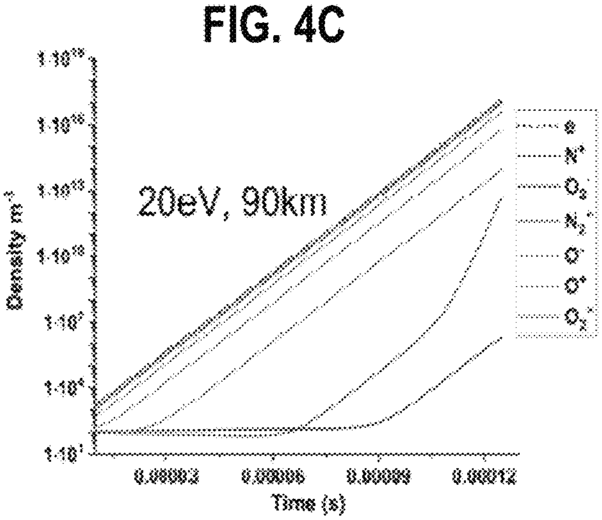
Figure 4F:
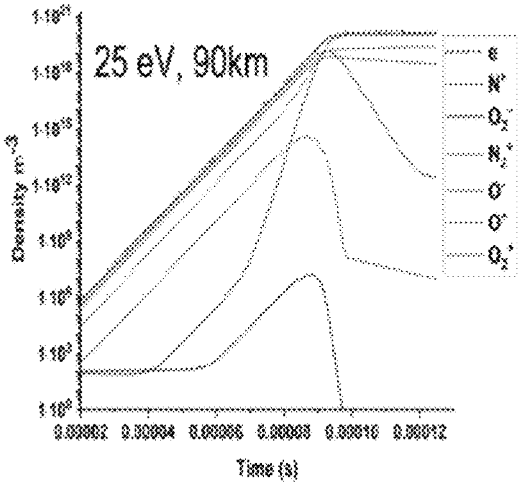
Figure 4G:
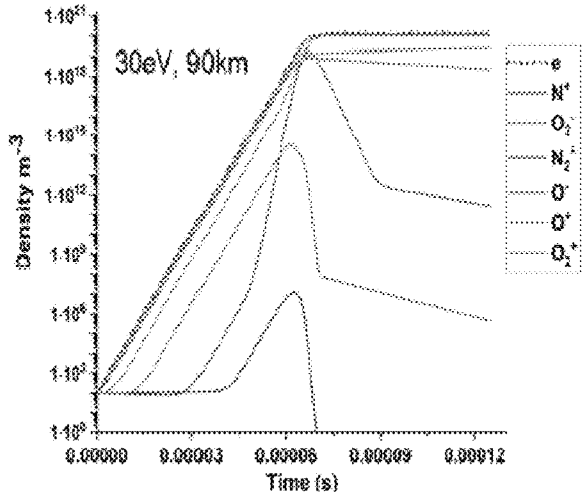
Figure 4H:
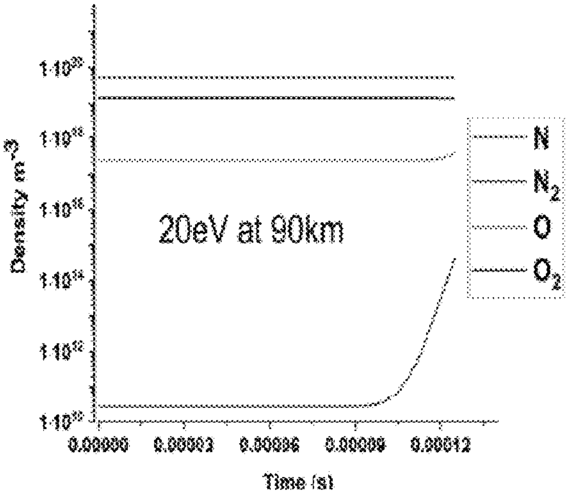
FIG. 4 shows variations of electron, ions ($N^+$, $O_2^-$, $N_2^+$, $O^-$, $O^+$ and $O_2^+$) and neutral species (N, $N_2$, O, and $O_2$) number densities with time for different mean electron energies (1-30 eV). This was performed at a 90 km altitude.
Figure 4I:
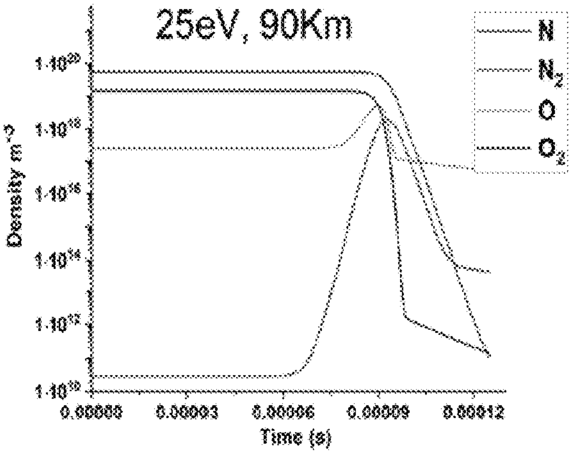
Figure 4J:
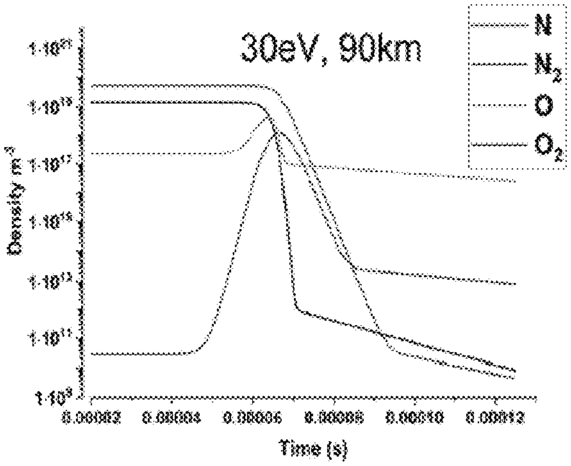

The simulation for 80 and 90 km was performed for 1-200 eV, but only 1-30 eV results are shown above. This was because the results do not vary beyond 30 eV. Initial densities for the ions and electrons were set at 100 $m^{-3}$. FIGS. 3A and 3B showed that the species growth trend was similar for 1 and 3 eV mean electron energy. Here, $O_2^+$ and $O_2^-$ densities are dominant. With the reactions $$N_2^+ + O_2 => O_2^+ + N_2 \text{ and } N^+ + O_2 => O_2^+ + N, N_2^+ \text{ and } N^+$$

ion density seems to be reducing and $O_2^+$ was increasing. For the 5 eV case (FIG. 3C), the electron density increases while $O_2^-$ density decreases because of electron detachment reactions. As the supplied mean electron energy is increased, the ionization reactions dominate thereby, increasing electron density. The electron energy is controlled by electron sources inside the channel as shown in FIGS. 1A, 1E. There is a great jump in densities for electrons and $N_2^+$ from 6-8 eV mean electron energy. For the 10-eV case (FIG. 3F), ion densities continue to increase with an increment in electron density (ionization). The attachment reactions (function of mean electron energy) were also taking place side by side, due to which $$O_2^- \text{ and } O^-$$

ion density increments occurred. For the case of 10 and 30 eV (FIGS. 3F and 3G), species were seen to be reaching the peak and reducing due to recombination reactions. For 30 eV, the simulation reached peak values faster than the 10 eV case. At the end of the simulation, the plasma consists majorly of electrons, $N^+$, and $O^+$ ions. In FIGS. 3H and 3I, neutral density variation for 80 km altitude can be observed. For 10 eV, there was a sharp increase in N and O density due to the dissociation of $N_2$ and $O_2$ molecules. Additionally, at 10 and 30 eV (less simulation time needed), a sharp decrease in $N_2$ and $O_2$ molecules occurs due to ionization.

Figure 5A:
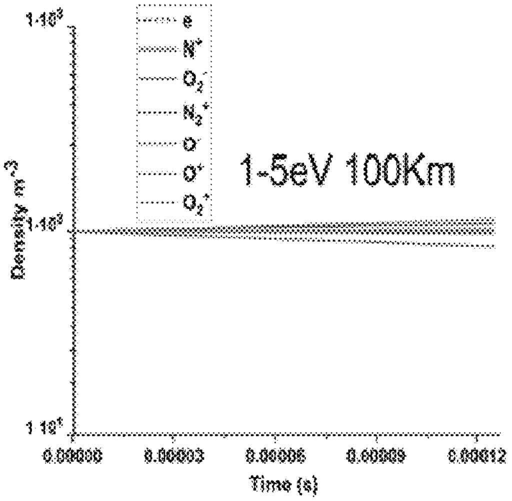
FIGS. 5A, 5B, 5C, 5D, 5E and 5F refer to 1-5, 10, 30, 50, 80 and 100 eV ions plots. The FIGS. 5G and 5H refer to 80 and 100 eV neutrals plots. Neutral density for 100 km used was $1.16\times10^{19}$ $m^{-3}$. Channel width and the length of the chamber is 0.03 and 1 m.
Figure 5B:
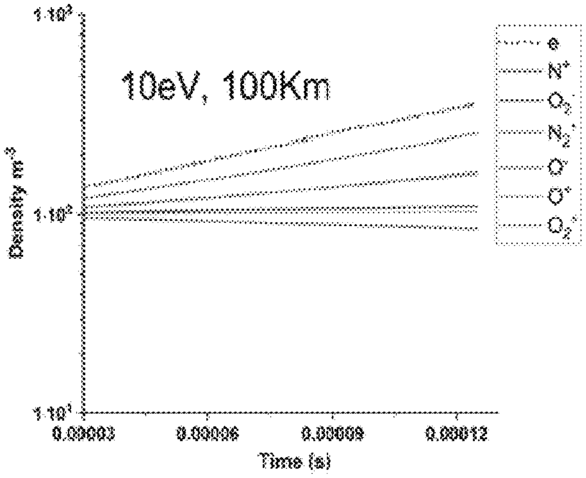
Figure 5C:
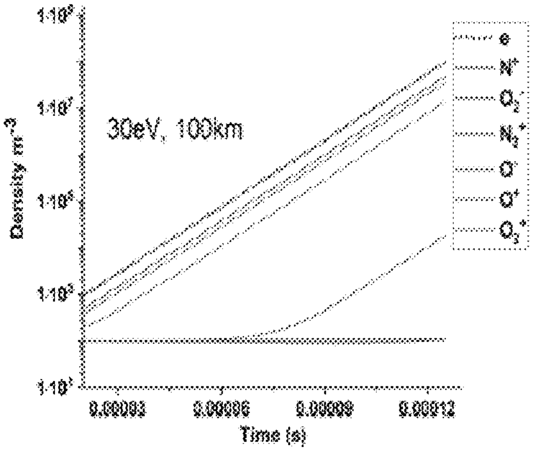
Figure 5D:
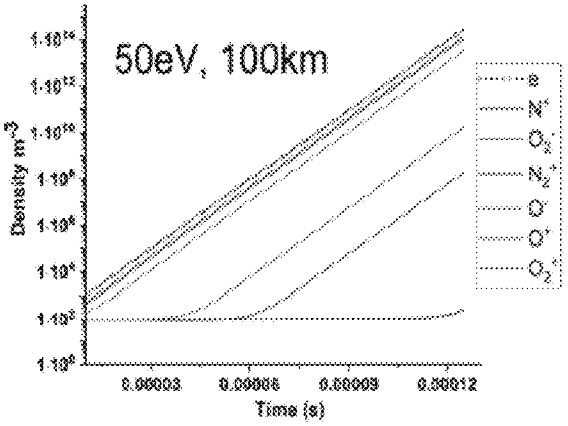
Figure 5E:
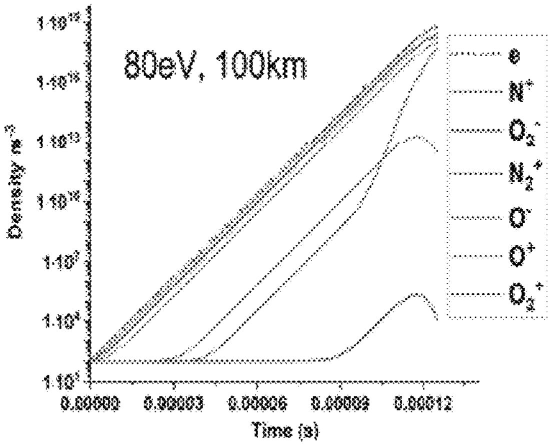
Figure 5F:
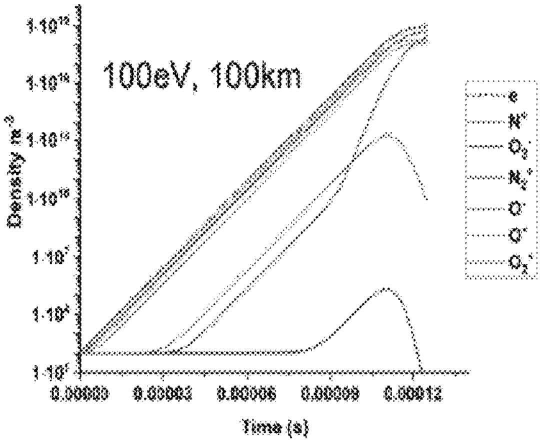
Figure 5G:
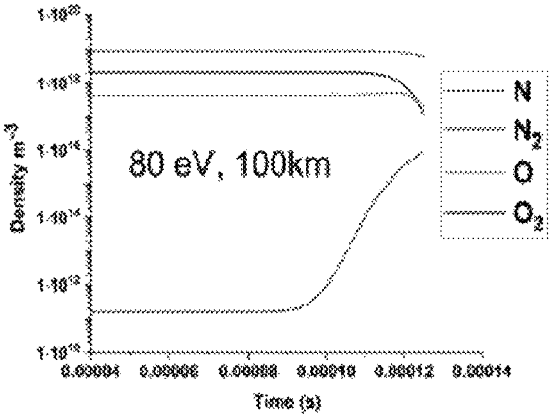
FIG. 5 shows variation of electron, ions ($N^+$, $O_2^-$, $N_2^+$, $O^-$, $O^+$ and $O_2^+$) and neutral species (N, $N_2$, O, and $O_2$) number densities with time for different mean electron energies (1-100 eV). This was performed for 100 km altitude.
Figure 5H:
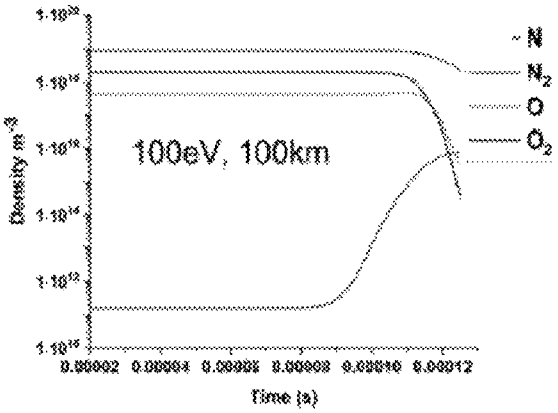
Figure 6A:
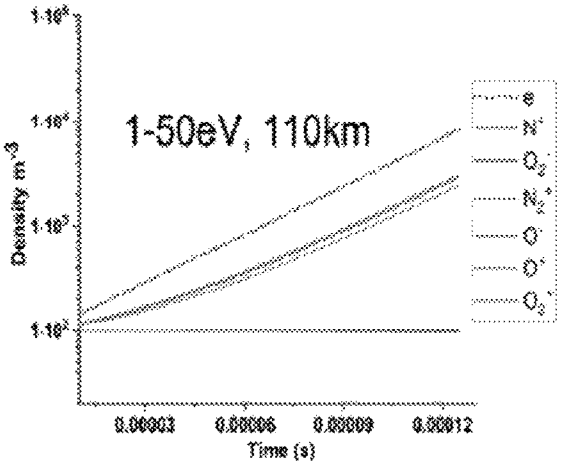
FIGS. 6A, 6B and 6C refer to 1-50, 80-130 and 130-200 eV ions plots. The neutral density for the 110 km used was $1.68\times10^{18}$ $m^{-3}$. The channel width and the length of the chamber are 0.03 and 1 m.
Figure 6B:
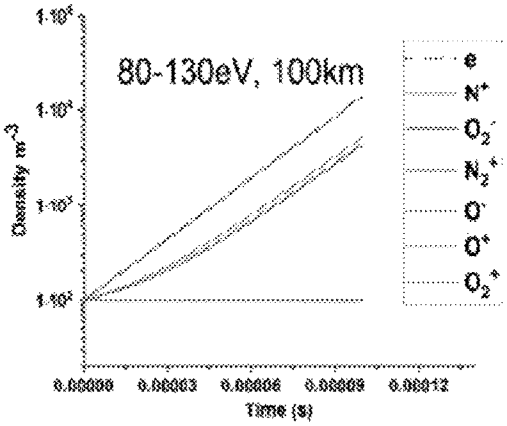
Figure 6C:
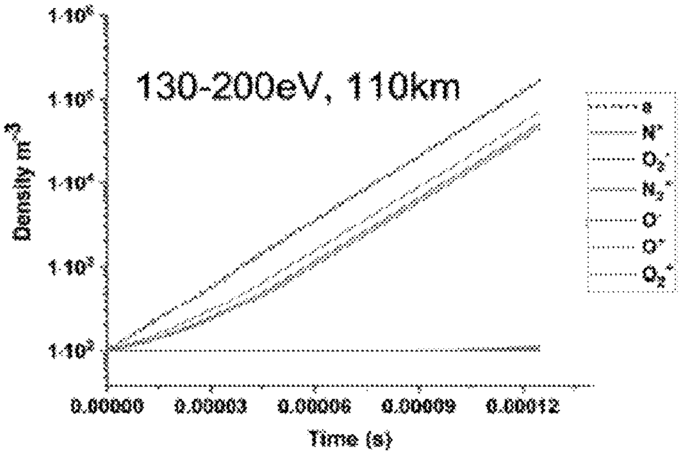

The simulation results for 90 km were performed as shown in FIG. 4. Neutral density is reduced, as shown in Table I. For 1, 3 (similar trend) vs. 5 eV (FIGS. 4A and 4B), a greater increment in $O_2^+$ and $O_2^-$ density was viewed as similar to the 80 Km altitude trend. At 90 km altitude, O density is greater and reactions like $$O^+ + O + \text{air} => O_2^+ + \text{air and } e + O + O_2 => O + O_2^-,$$

caused high $$O_2^+ \text{ and } O_2^-$$

ion density production. These reactions also explained why $$O_2^+$$

density was leading instead of electron density, in the case of 5 eV. At 10 eV, ionization reactions of $N_2$ and $O_2$ dominate. There was a great increment in the electron density in the 15-20 eV (FIGS. 4D and 4E) range. For 25 and 30 eV (FIGS. 4F and 4G), species reached peak values such that the plasma contained electrons, $N^+$, and $O^+$ species. The trends for the neutral densities were like 80 km altitude results. Also, N density at the end of the simulation eventually reaches a higher density ($10^{12}$ $m^{-3}$ from FIG. 4I) when compared with the initial density ($10^{10}$ $m^{-3}$). When compared to reach peaks, 80 km case for 30 eV reaches peak faster than 90 km. The simulation results for 100 and 110 km altitudes can be observed in FIGS. 5 and 6. The air density in these altitudes is lower than 80 and 90 km, and the O density increases at that altitude. As shown in Table I, it can be inferred that for 110 km altitude, O density is close to $O_2$ density. Therefore, attachment is higher, which thus creates fewer oxygen-positive ions. The oxygen molecule also dissociates into O to form $O^+$ and $O_2^+$ ions. For the 1-5 eV case (FIG. 5A), a similar trend was viewed as the case of 80 and 90 km altitude. The increase in the density was greater due to high O density at these altitudes. At 10 eV (FIG. 5B), an electron density increment can be seen. Also, $N_2^+$ trend is like the results from 80 and 90 km altitude at 10 eV. For 30 eV (FIG. 5C), electron density increase leads due to the ionization of $N_2$ and $O_2$. Additionally, it can be observed that the $N^+$ ion density transitions from low value to its peak in 30-100 eV mean electron energy. After 100 eV (FIG. 5F), density values do not change significantly. The growth of $O^+$ and $N^+$ ions was also caused due to increase in N and O density. The peaks for $O_2^-$ ions can be seen to reduce with altitude. The plasma at 100 km altitude for 100 eV contains electrons, $$O_2^+, N_2^+, O^+, \text{ and } N^+.$$

For neutral density, mean electron energies 1, 3, 5, 10, 30, and 50 eV plots show no significant change. At 80 and 100 eV, an increase in N density can be noticed as expected. Due to the higher density of O, it takes a longer time to ionize it. The simulation results for 110 km were presented in FIG. 6. For positive oxygen ions, from Table I, it can be inferred that for 110 km altitude, O density is very close to $O_2$ density. Therefore, we have higher ionization, and the $O^+$ ions can be observed to be leading in 130-200 eV after electrons. The oxygen molecule also dissociates into O to form $$O^+ \text{ and } O_2^+$$

ions. The electron density increases from $10^4$ to $10^5$ $m^{-3}$ for 50-130 eV mean electron energy, followed by $O^+$ ions beyond 50 eV. There were no changes in the neutral densities in the case of 110 km. The simulations for 100 and 110 km altitudes did not reach the peak values due to the limitation of simulation time (based on an ionization chamber length of 1 m). It would take more than 0.125 ms for higher altitude simulations to reach peaks since the mean free path increases with the altitude. In the above simulations, the maximum negative ion density attained was around $10^{15}$ $m^{-3}$. The attachment cross-section of $O_2^-$ rises strongly with the decrease in electron energy. Understanding the oxygen-negative ion formation is crucial as the ionization chamber channel could potentially undergo oxidation and oxide layer formation on its surface. The oxidation of the surface, especially the cathode, could reduce the engine's lifetime and elevate unwanted drag due to friction inside the engine. A potential solution was suggested by the authors in their article that discussed regarding sorption of oxygen to a perovskite-type ceramic sorbent at a high temperature ranging from 300-800° C. To calculate O flux on the surface of the spacecraft and study corrosion, Jing et al. built an atomic oxygen simulation model.

Additionally, the authors proposed the atomic oxygen generator design for material degradation studies. Lastly, Romano et al. considered deriving an inductively heated plasma generator to handle corrosion effects. These methods could be used to study and eliminate the corrosion and electron attachment effects in the ABPT. The prime objective would be to minimize the impact of corrosion and drag inside the engine. By preventing the negative ions from neutralizing with the walls (then causing erosion), our grid-less concept of self-neutralization operation where both positive and negative ions will be extracted and used to produce thrust would therefore be advantageous. Therefore, the main goal is to utilize these negative ions and positive ions to create a neutralized beam at the exit of ABPT and eliminate the requirement for an external cathode neutralizer.

Simulation of Self-Neutralizing Operation

Figure 7:
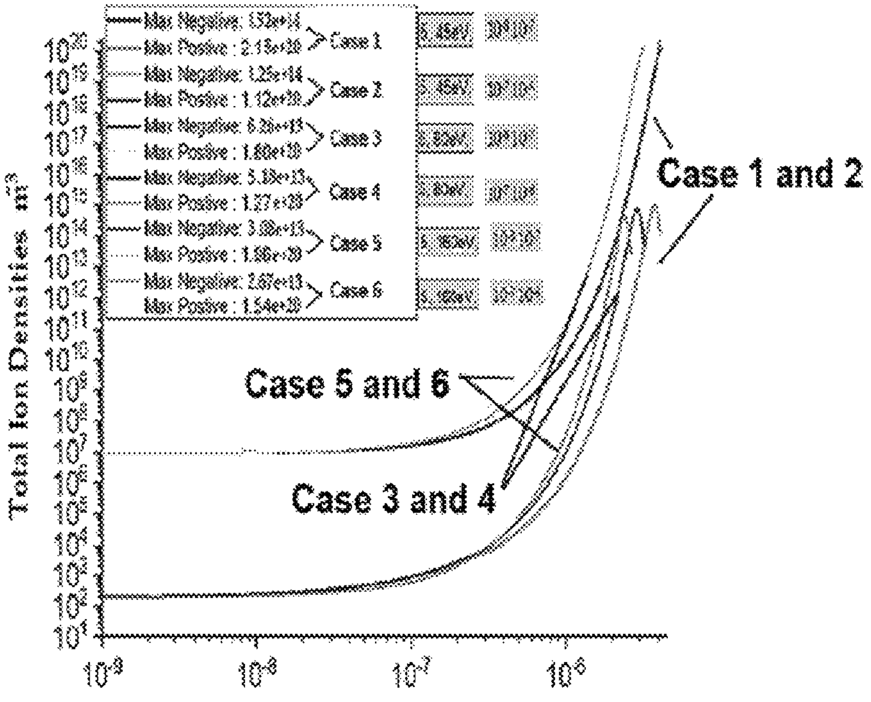
FIG. 7 shows different cases and condition outputs for pulse simulation showing total negative and positive ion density obtained in each case. The above pulse simulations were performed using initial density conditions for 80 km altitude. Cases 1, 2, 3, 4, 5, and 6 are shown in the grey boxes (and marked) from top to bottom (max positive and negative ion density for each case). The Grey box contains low-high mode operation energies (eV) and respective $\mathcal{T}_2$ and $\mathcal{T}_1$ (s) time.

In this simulation, we consider alternating mean electron energy with various pulse durations to produce alternating positive and negative ions. Mode operation of low energy for a longer duration could have higher negative ions density. From FIG. 7, the pulse period to achieve the same negative and positive ion density can be seen. For example, in the 5, 45 eV energy range, to reach around $10^9$ $m^{-3}$ densities, lower and higher energy needs to have a pulse width of $1\times10^{-6}$ s and $4\times10^{-7}$ s to achieve the same density. For lower energy range, negative ions production is more significant with lower frequencies $$(\text{frequency} = \tau_2^{-1}, \tau_1^{-1}\text{Hz}).$$

Figure 8:
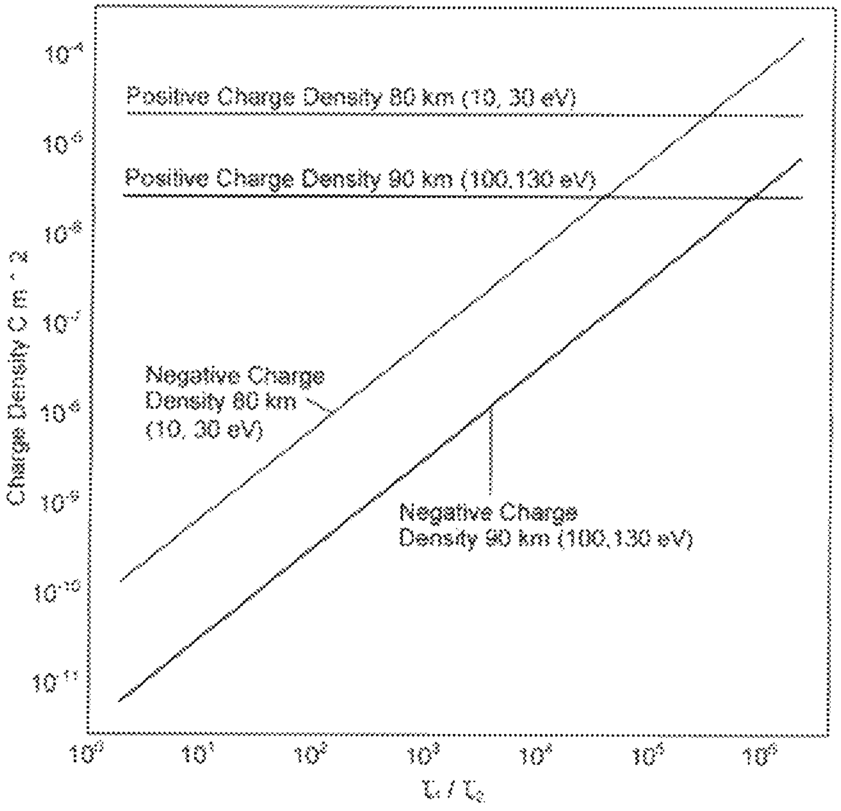
FIG. 8 shows net negative and positive Ion charge density for 10, 30 eV energy range for 80 km and 100, 130 eV range for 90 km, varying with $\mathcal{T}_1/\mathcal{T}_2$. Here, $\mathcal{T}_2$ is set constant ($2\times10^{-11}$ s), and $\mathcal{T}_1$ is changed between ($4\times10^{-9}$ to $9\times10^{-4}$) s. These operation times were chosen after verification by performing myriad simulations with a combination of different times and energies to produce peak ion densities.

This was also observed in our simulation. The negative ions' density was significantly smaller as compared to positive ions. Additionally, lower energy required longer simulation times to reach peak densities from our simulation. The simulation reached a steady state faster for a wide mode operation energy range (5, 160 eV). The reaction rates for ion species caused reactions to accelerate when the high energy mode was switched on. The simulation follows quasi-neutrality. From FIG. 8, high-low mode operation energies 10, 30 eV for 80 km and 100, 130 eV for 90 km have the highest negative ion production. Given the total positive and negative ion density obtained from the self-neutralization simulation, net ion total charge density can be calculated. The total charge density exhausted from the thruster can be calculated as:

$$Q = nieUe\tau \tag{2}$$

The total charge density was calculated using equation (2). Where Q, $n_i$, e, $U_e$, and $\tau$ are net charge density ($C/m^2$), positive/negative ion density ($m^{-3}$), charge, exhaust velocity (m/s), and $\tau$ is the mode operation time ($\tau_1$ or $\tau_2$ s). The results plotted in FIG. 8 were based on simulations performed with profuse combinations of lower, high energy, and pulse width ranges. After selecting 10, 30 eV for 80 km and 100, 130 eV for 90 km, low and high mode operation energies, total charge density variation with the mode operation times ratios were plotted. The $\tau_2$ time was decided as the positive ions took less time for production and reached a peak for the simulation time of $2\times10^{-11}$s. Whereas, the negative ions took longer for peak ion production/extraction (simulation time of $4\times10^{-9}$s). The time $\tau_1$ (s) was varied from $4\times10^{-9}$ to $9\times10^{-4}$s. The operation time range was set to cover a broad spectrum of time ratios for obtaining the condition of neutralization. With the increment in mode operation time $\tau_1$ (s), the negative ion total charge density was increased. The objective of this plot was to obtain a condition when the extracted net positive and negative charge densities would cancel out to provide a requirement for neutralization. While removing positive ions, the discharge potential at the exhaust would drop, whereas it will increase in the case of negative ions. It was observed that at $6\times10^{-6}$ s $\tau_1$ for 80 km ($\tau_1/\tau_2$ is $3\times10^5$) and $2\times10^{-5}$ s $\tau_1$ for 90 km ($\tau_1/\tau_2$ is $1\times10^6$), the net charge densities would cancel out. The low-high energy mode operation could be designed based on the obtained $\tau_1$ and $\tau_2$ values.

ABPT Performance Calculations

In this section of the present disclosure, the ABPT design performance was estimated. Based on the idea of bi-modal operation, parameters such as thrust, power, and thrust-to-power ratio can be obtained. This segment also involves calculating drag force based on variation in the geometry dimensions so a condition of thrust greater than drag could be obtained. The thrust was calculated for both low and high energy modes depending on the respective negative and positive ion densities. Afterward, a time average of thrust was obtained to check if it could compensate for the drag force. The performance calculations are shown below.

Thrust can be estimated as follows:

$$T = \dot{m}(V - V_0) \tag{3}$$

Here T, ṁ, V, and $V_o$ are thrust (N), mass flow rate (Kg/s), exhaust, and initial velocity (m/s), respectively. Mass flow rate and exhaust velocity can be obtained:

$$\dot{m} = M\pi(r_b^2 - r_a^2)V_o n_i \tag{4}$$

And, $$V = \sqrt{\left(\frac{2\varphi e}{M}\right)} \tag{5}$$

Given above, M and φ are $$N_2^+/O^-$$

ion mass (Kg) and extraction voltage (200, 500, and 750 V). It is important to calculate drag for a cylindrical ABPT geometry. Assuming the engine to have an outer and inner radius ($r_b$ and $r_a$), the maximum possible drag on the ABPT can be estimated as follows, $$D = M_a n_{gas}\pi(r_b^2 - r_a^2)V_o^2 \tag{6}$$

Here, D, $M_a$, and $n_{gas}$ are drag force (N), the mass of air ($2.44\times10^{-25}$ Kg), and gas density ($5.7\times10^{20}$ $m^{-3}$ and $6.97\times10^{19}$ $m^{-3}$ for 80 and 90 km altitude). The outer radius ($r_b$) used in calculating drag was 0.05 m, whereas the inner radius ($r_a$) was varied from 0.04 to 0.03 m, to understand the effect of geometry on drag force. The average thrust force was calculated using the results from high and low energy modes. Using the equation (3) obtained above, the time-averaged thrust force can be estimated as:

$$T_{average} = (T_{high}\tau_1 + T_{Low}\tau_2)/(\tau_1 + \tau_2) \tag{7}$$

After calculating the average thrust, the average power supplied to the discharge to produce the required output was calculated. We intend to estimate the order of magnitude of the power level required in the scope of the present disclosure due to the known complexity of electron transport analyses due to anomalous mobility. As such, we have calculated only ion current for such an estimate. The power associated with ion current can be calculated as:

$$P_{average} = \varphi\left[(I_i)_{high}\tau_1 + (I_i)_{low}\tau_2\right]/(\tau_1 + \tau_2) \tag{8}$$

The average power supplied here is a function of ion current (high and low energy mode) and mode operation time. The ion current can be obtained as follows:

$$I_i = n_i e V_0 \pi(r_b^2 - r_a^2) \tag{9}$$

Here, $I_i$ and $n_i$ are ion current and ion density. As the ABPT needs to operate in a bimodal function, ion current for positive and negative ions was calculated. The average thrust obtained using high, and low energy thrust forces at different extraction voltages (200, 500, and 750 V) was 45.44, 82.1, and 104 N for 80 km and 5.52, 10, and 12.63 N for 90 km altitudes. In contrast, the drag force generated on the geometry of ABPT was calculated by keeping $r_b$ as 0.05 m and for different values of $r_a$ (0.04, 0.035, 0.03 m). Based on the calculations, the drag force obtained was 25, 36, and 44 N for 80 km and 3.1, 4.31, and 5.5 N for 90 km altitude. This is the max drag that can be caused on the ABPT surface. An in-depth analysis would be required in future studies to study drag force inside the engine (due to skin friction and thickness). The investigation would also be dependent upon the defined transition region. For altitudes above 120 km, generally, DSMC simulations would be required to estimate the drag coefficients and force.[8] In case of lower altitudes such as 80-110 km, heating rates would also be added to a drag model for simulation to obtain a probable drag coefficient and force. Based on the above results, a 300V+ extraction voltage system could potentially be an effective solution for generating positive thrust and drag compensation. The ion currents for low and high energy modes obtained were 15 mA and 4.58 kA for 80 km and 0.7 mA and 0.556 kA for 90 km altitude. The negative and positive ion densities used for calculations were $3.84\times10^{15}$ and $1.14\times10^{21}$ $m^{-3}$ for 80 km and $1.801\times10^{14}$ and $1.385\times10^{20}$ $m^{-3}$ for 90 km. The neutralization was achieved by extracting the produced ions based on their $\tau_1$ and $\tau_2$ values such that the plume would be neutral. To keep the average power minimum as possible, the average power supplied to the discharge at extraction voltage 300 V was obtained at 80 km as 1.37 MW for a thrust of 59 N, which is sufficient to counter 58 N of drag ($r_b$ and $r_a$ as 0.05 and 0.03 m). The average power supplied at the same extraction voltage at 90 km altitude gave a power value of 166 kW for the thrust of 7.2 N to counter 7.18 N of drag force successfully. At 80 km, the power is relatively high, thus making the thruster operation challenging.

On the other hand, the power reduces at 90-100 km and creates more favorable conditions. Pekker and Keidar also concluded that high power would be required when complete ionization is assumed. In addition, we have calculated the maximum possible drag whereas, in reality, only lateral surfaces will experience drag. The drag analysis for this is beyond the scope of the present disclosure. However, the thrust and power requirements might be reduced. The power required by ABPT can be transmitted to the satellite for maintaining the orbit and can potentially be fulfilled using a laser-beamed power transmission. Using the values of thrust and power, the thrust-to-power ratio of 43 mN/kW for 80 km and 43.4 mN/kW for 90 km was calculated at 300V extraction voltage. From FIG. 9, the drag and thrust forces vary concerning geometry and extraction voltage. In time-averaged thrust, values as high as 104 and 12.63 N for 80 and 90 km could be achieved with 750 V extraction voltage.

Concluding Remarks

The present disclosure aimed to understand the ionization process inside an ABPT to develop a practical design solution for VLEOs. Conceptually it was shown that this ABPT design could work constructively in 80-90 km altitudes by producing sufficient thrust to compensate for the drag. Such an engine could also be used at higher altitudes with variations in the geometry. Species such as $N^+$, $O^+$, and $O^-$ were dominant in maximum positive and negative ion densities obtained from the simulations. We have found that ionization degrees (electron density/neutral density) were high in the altitude range of 80-90 km.

In the present disclosure, the possibility of neutralization by operating the ABPT in low and high-energy modes was explored. The idea was to obtain the bi-mode operation time ratio for low-high energies to reach the condition when the cumulative positive and negative ion charge densities after extraction would cancel out for the ABPT. The energy range for selecting the highest negative ion production was elected by performing myriad chemical kinetics simulations. The energy range (10, 30) and (100, 130 eV) for 80 and 90 km altitude was set for ion total charge density calculation. It was noticed that by mode operation of the ABPT in low-high energy mode for $6\times10^{-6}$ s and $2\times10^{-11}$ s for 80 km and $2\times10^{-5}$ s and $2\times10^{-11}$ s for 90 km, the net charge densities would cancel out after extraction and thus resulted in fulfilling the criterion of self-neutralization. Based on the densities obtained, parameters such as ion, electron current, time average thrust, drag, power, and thrust-to-power ratios were obtained at different extraction voltages. The average thrust obtained was sufficient to maintain the orbit by drag compensation in the 80-90 km altitude region.

To validate the obtained results and prediction of ionization, an experimental approach would be crucial. It would be interesting to develop methods to increase the ionization degree for 100 km and above altitudes. An in-depth analysis for electron current measurement would be required to estimate the total power supplied. Methods such as Rayleigh Microwave scattering, and optical emission spectroscopy could be used in the future to experimentally obtain the species densities and plasma temperature for comparison with simulation results.

Embodiment B

Figure 10A:
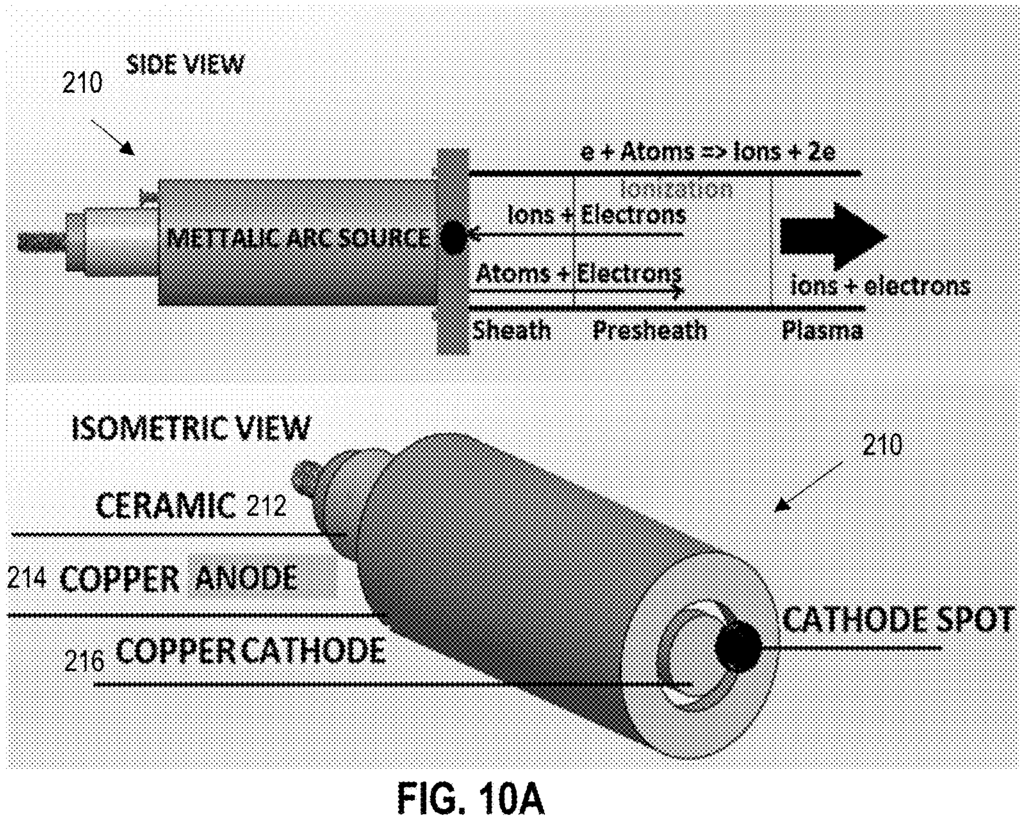
FIG. 10 shows schematics of an AES showing the vacuum are plasma source, FIG. 10A, comprising of cathode, anode, and the ceramic gap. The highly concentrated electric field forms between the gaps to initiate a cathode spot.
FIG. 10B Placement of an electron extraction aluminum grid in the vicinity of the source. The energy of the extracted electrons is controlled by varying the electric potential of the grid. The electrons are removed due to the electric field formed between the vacuum arc source and the grid.
Figure 10B:
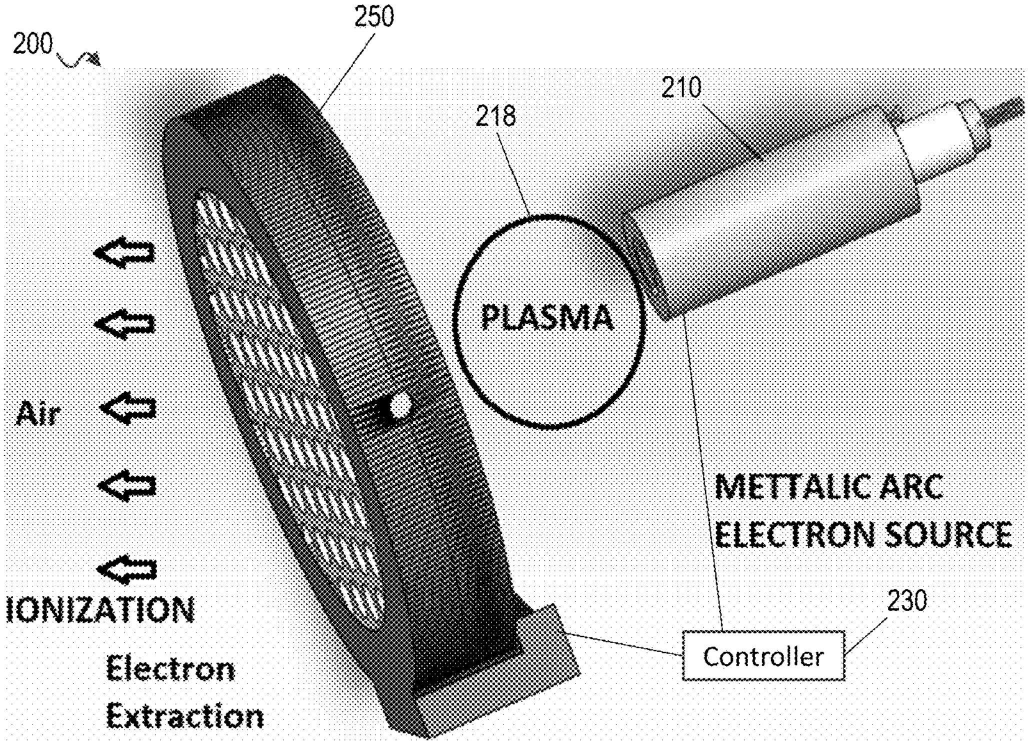

FIGS. 10A, 1B shows another example embodiment of the air-breathing plasma thruster (ABPT) 200 of the present disclosure. Referring to FIG. 10B, the thruster 200 includes a metallic arc electron source 210 and a grid 250. In one embodiment, the electron source 210 and grid 250 are located within a thruster body and a support, embodiment A, and the electron source 210 and grid 250 can be arranged linearly, for example by being attached to the support. As best shown in FIG. 10A, the electron source 210 includes a ceramic layer 212, copper anode 214, and copper cathode 216.

Referring back to FIG. 10B, the electron source 210 generates plasma 218. The plasma 218 then passes to grid 250. The electron source injects electrons into the air thus helping air ionization, i.e. production of ions.

Earlier, it was mentioned that AES would require a prominent control over electron energy to be utilized as a suitable electron source for SABPT design. To that end, AES includes an electron extraction grid (FIG. 10A). The grid is positively biased to extract the electrons from the vacuum arc plasma. The increase in bias on the grid results in the increment of the mean electron energy. The high energy would result in greater positive ion density, while the low electron energy mode causes negative ion generation (dissociative electron attachment). The electron current is a function of electron drift velocity, so an increase in grid voltage increases electron current. However, electron extraction is disrupted at exceedingly high voltages and pressure due to arcing as the AES operation lands up to the Paschen curve. The increase in the electron energy results in enhanced collisions with neutral air atoms, thereby causing ionization. The ionization rate (electron density/neutral density) increments with the grid voltage (mean electron energy) like the observation in Ref. 1. Simultaneously, at lower energies (less than 4 V), $O^-$ ion density is more significant than positive charge density as the attachment dominates the ionization rate coefficient. The schematics of air ionization using AES are shown in FIGS. 10A and 10B. The design (FIG. 10A) is divided into the source (behind the grid) and the air ionization region (above the grid). The source segment (FIG. 10A) shows the electron emission, ionization, and charge diffusion mechanisms. A small portion of ions returned to the surface after ionization, causing heating and generation of cathode spots. Later, we prove that the AES can generate both positive and negative ions by operating at high and low energy (voltages).

The present disclosure characterizes AES for air ionization applications in a SABPT. The experimental data presented here demonstrate the generation of positive and negative ions. The diagnostics methods such as Langmuir/Faraday probe, optical emission spectroscopy (OES), and magnetic filter to measure negative ion current was utilized to characterize the air plasma. The Langmuir/Faraday probes were used to obtain ion/electron current, electron temperature, and electron density as a function of pressure and electron energy. Ion current measurements concerning distance from the source were obtained as a function of pressure and grid voltage. Optical emission spectroscopy was used to estimate the electron temperature, electron density, and electron energy distribution. Lastly, a magnetic filter was designed/tested to analyze the presence of negative ion current in the air plasma.

Design and Characterization of AES for Air Ionization

The primary focus of the present disclosure is to characterize air ionization using AES. The present disclosure also suggests that by modulating the energy of AES and as such forming positive and negative ions, a low-power self-neutralizing SABPT can be achieved. FIG. 10A shows a vacuum arc source, a copper anode, a cathode, and a non-porous alumina ceramic. The cathode spot is formed on the ceramic between the cathode and anode. This cathode spot can rotate under the influence of an axial magnetic field in J (current density)×B (magnetic field) motion.

A complete electron source comprising a vacuum arc source and the electron extraction grid can be observed in FIG. 10A. The extraction grid is positively biased concerning the ground. The extracted electron current and energy are the functions of applied grid potential. The electron current extracted saturates at some applied voltage. A typical electron source (hollow cathode) would require a vacuum environment, a thermionic emitter heating system, and a separate propellant tank for its application. In the present disclosure, we have shown that our AES does not require those systems. Most importantly, AES can efficiently operate in the medium pressure range ($10^{-4}$ Torr–$10^{-1}$ Torr). The main objective is to utilize negative ions and positive ions created in the ionization process using AES leading to an extracted neutralized beam at the exit of SABPT. Both negative and positive ions will be accelerated by appropriate electric field arrangement and switching electrodes' polarity.

Figure 11:
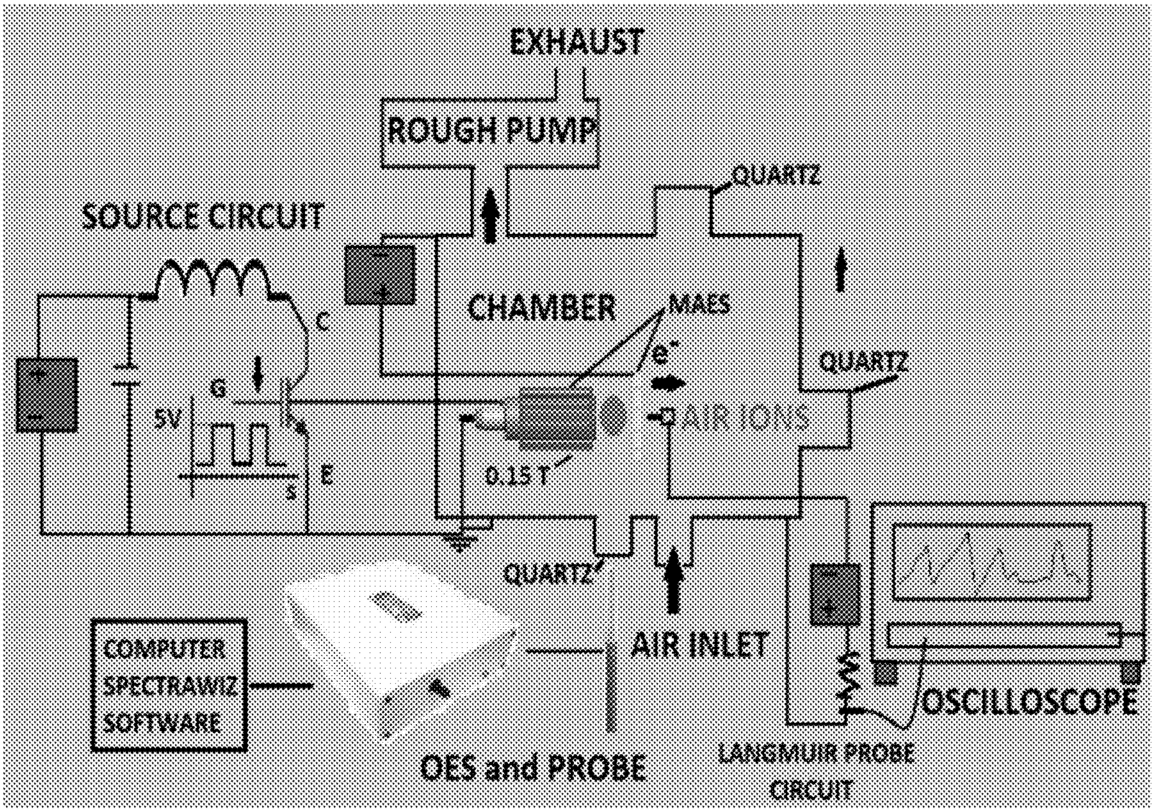
FIG. 11 shows schematics of the plasma diagnostics for AES have been described. The diagnostics methods for ion current measurements and OES are displayed. The signals are obtained over the oscilloscope. The plasma chamber was grounded for all the experiments.

The present disclosure describes the AES using intrusive and non-intrusive plasma diagnostics methods. FIG. 11. shows the schematics for the system design configuration starting with an inductive energy storage circuit to power the AES. The inductance, capacitance, switch, input DC voltage, PWM (pulse width modulation) width, frequency, and the coil magnetic field values were 550 μH, 6800 μF, $IXYH50N_{120}C3D1$ IGBT, 30 V, 610 μs, 5 Hz, and 0.15 T.

During the stage 1, the IGBT gate was closed, and high emf is generated in the inductor as it charges.

The gate was opened in the second stage, and the stored inductor energy was discharged into the vacuum arc source. With the addition of a capacitor, the overall discharge current was increased. The radius and length dimensions for the cylindrical cathode, anode, and ceramic are 5.5 mm and 40 mm, 6.5 mm, and 35 mm, and 12.5 mm and 30 mm, respectively. These dimensions were chosen tentatively as our primary focus is studying ionization and optimization. The ceramic was thin enough for a good conduction gap and required a thin carbon paint layer (100Ω-200Ω resistance between cathode and anode) to ignite the arc. The electron extraction grid is an aluminum grid aperture (diameter 4 mm for each opening) placed on a 50 mm diameter 3D printed extraction grid holder. The aperture was 25 mm away from the source to avoid arcing. The chamber was pumped down using a roughing pump to reach a base pressure of 0.05 Torr. An air leak allowed for a small air flow rate into the chamber. A Langmuir probe with a 2 mm wire length was placed in front of the grid for Langmuir probe experiments. A Faraday cup made up of aluminum was used for ion current measurements. For OES, a Stellar Net Inc. OES spectrometer was coupled with an optical probe placed close to the quartz viewing port of the chamber. The SpectraWiz software was used on the PC to monitor the spectrum. Lastly, the magnetic filter (to measure negative ions) was designed for a length and diameter of 50 mm and 14 mm with a magnetic field of 0.12 T using Alnico permanent magnets (diameter and height as 22 mm and 8 mm).

Optimization Using Magnetic Field

We designed and added an air-cored coil axial magnetic field of 0.15 T to the vacuum arc source to improve the performance. The magnet system does not require an external circuit, and it can be easily integrated into the source. The addition of a magnetic field causes cathode spot rotation and uniform cathode erosion at the cathode-ceramic interface to improve the performance of the source.

Figure 12A:
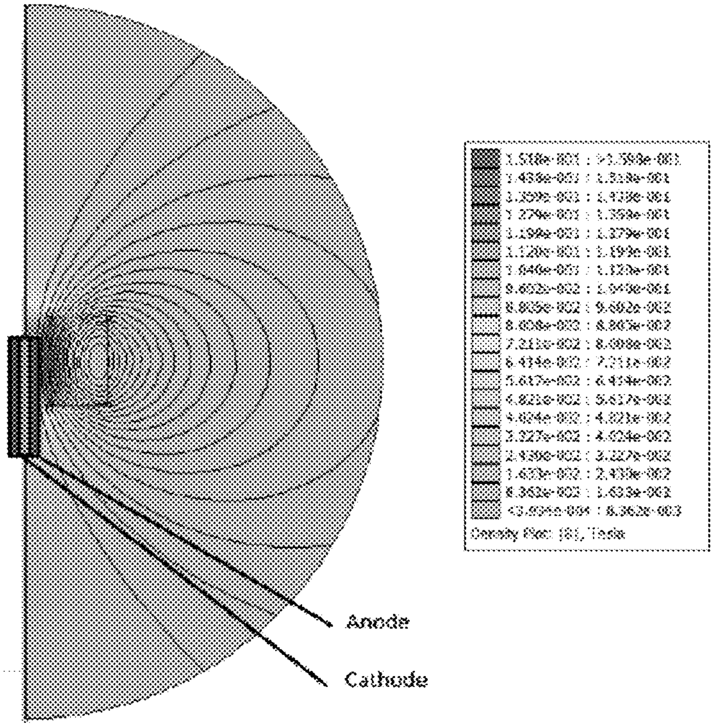
FIG. 12 shows a FEMM Magnetostatics simulation for an air-cored coil magnet, FIG. 12A, current ratio vs. magnetic field when the distance between source and Faraday cup is 35 mm, FIG. 12B.

Additionally, plasma bends in the J×B direction leading to improvement in ionization, causing an increment in the plasma density and velocity. The ionization in the source was improved with an increase in the magnetic field. The goal was to obtain the optimum magnetic field condition for AES such that the air ion/electron current was maximized. An air-cored coil magnetic field was simulated in FEMM software, as shown in FIG. 12A. An axisymmetric time-invariant field equations model was simulated with input conditions of the number of turns, wire gauge, input current, coil radius, and height as sixty-eight turns, AWG 24, 36 A, 12.5 mm, and 13 mm. A peak magnetic field of around 0.15 T can be observed in the middle of the core.

Figure 12B:
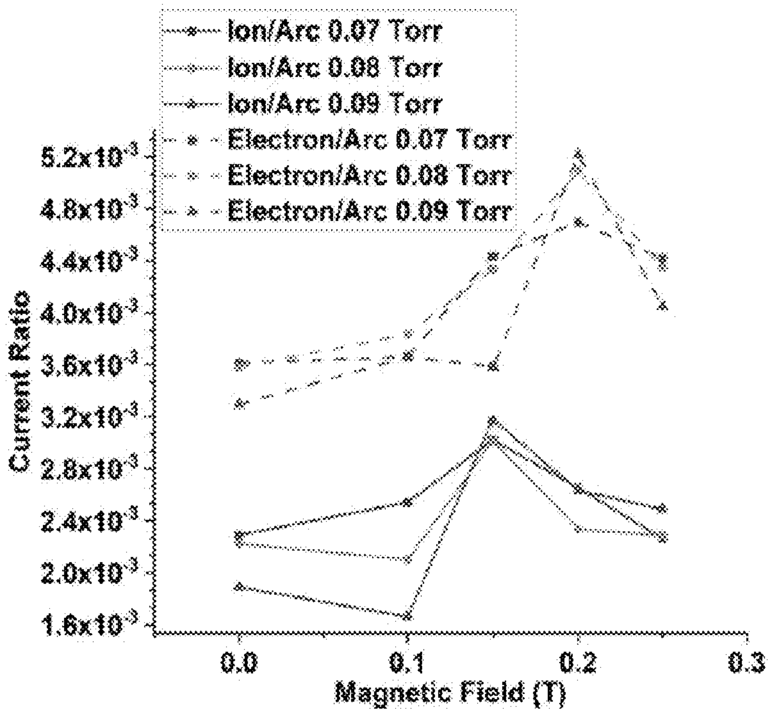
Figure 13:
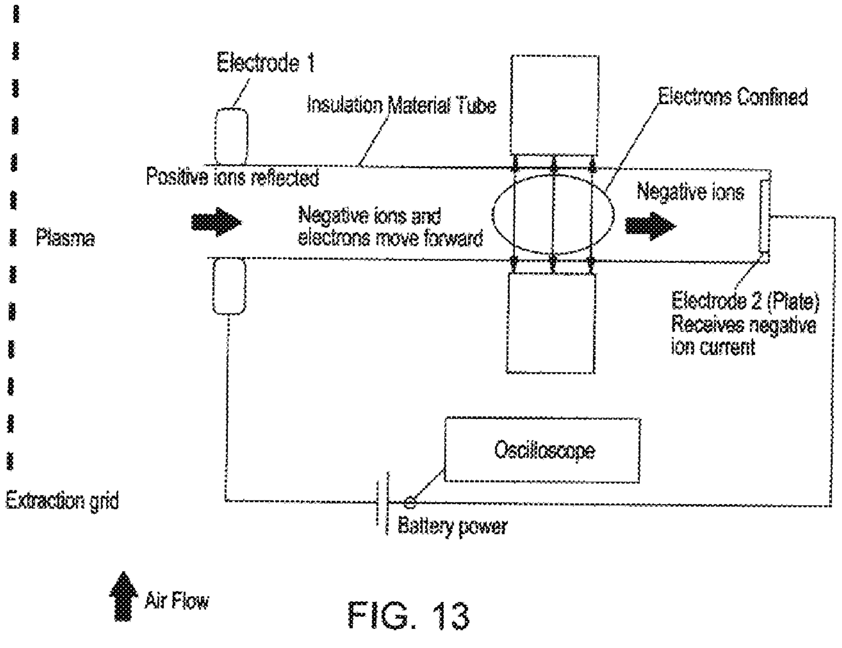
FIG. 13 shows a tube design for the magnetic filter. The design calculations based on equation 3 result in the drift tube length of 5 cm for a 0.12 T magnetic field. The design configuration can be observed: radial magnetic field design for electron confinement such that negative oxygen ion current was received at electrode 2. Negative charges drifted from low to high potential while the positive charges were repelled.

Air ion and electron current experiments were performed at different pressures concerning applied magnetic field 0 T-0.25 T. As observed in FIG. 12B, the 0.15 T-0.2 T field showed peak performance, but 0.15 T was chosen. Ion and electron currents were measured using an Aluminum Faraday cup (diameter 56 mm) placed 35 mm away from the source by biasing it—(for ions)/+(for electrons) 40 V. The magnetic field significantly increased the ion and electron/arc current ratio. Beyond 0.2 T, there is a reduction in ion or electron/arc current ratio; this is likely due to electron confinement leading to disruption of the are current.

Langmuir Probe and Faraday Cup

The Faraday cup experiments were performed using a cup area of 0.03 $m^2$. The current was calculated using Ohm's law for a potential drop across a 100Ω resistor. Additionally, the Langmuir probe was built with titanium wire for a thickness and length of 1 mm, and 2 mm exposed to the plasma (the remaining was shielded using a non-porous alumina ceramic). Results have been presented below.

Optical Emission Spectroscopy (OES) and Plasma Chemistry

The OES technique gave an insight into plasma chemistry by studying the emissions in the visible spectrum. The emission lines are interpreted from the NIST database for atoms and the molecular spectra book for molecules. The results of OES can also assist in understanding plasma chemistry. The electron temperature, electron density, and energy distribution function parameters could be calculated. The natural logarithmic equation (10) is based on two selected line spectrums.

$$\ln\left(\frac{\lambda_i I_i}{A_i g_i}\right) = \frac{-E_i}{k_B T_e} + \text{Constant} \tag{10}$$

Here i, I, λ, A, g, $k_B$, $T_e$, and E are spectral line number, spectral line intensity, wavelength (nm), transmission probability, statistical weight, Boltzmann constant ($1.38\times10^{-23}$ $m^2$ Kg $s^{-2}$ $K^{-1}$), electron temperature (eV) and energy (eV). The equation (10) mentioned above can be curve fitted to obtain electron temperature. When plugged into the ion saturation current equation from the Langmuir probe, the electron temperature can give electron density. Alternately, the Saha equation could also be used to obtain electron density. The above equations are based on the local thermodynamic equilibrium (LTE) condition. The vacuum arc sources have EEDF (electron energy distribution function) in the Maxwellian regime due to LTE and high collision frequency. This condition can be used for our case because the incoming airflow is exceptionally low-density. The next step is to obtain the reaction rate coefficient for attachment and ionization reactions. The rate coefficients can determine the rate of positive and negative ions formation based on the plasma chemical reactions and their transport coefficients. The rate coefficient is given by, $$k_k = \sqrt{\frac{2.5477e}{m_e}} \int_0^\infty \sigma_k(\varepsilon)\varphi^{-1.5}\varepsilon e^{\left(\frac{-\varepsilon}{\varphi}\right)} d\varepsilon \tag{11}$$

Here, e, ε and φ, $m_e$, and $\sigma_k(\varepsilon)$ are electron charge, electron energy (eV) and mean electron energy (eV), the mass of the electron ($9.1\times10^{-31}$ Kg), and electron impact collisional cross-sections ($m^2$). The formation rate for specific reactions can be obtained by multiplying rate coefficients with their respective reactants' number densities. The above equations 10 and 11 consider LTE. The Boltzmann equation shall be solved in the case of non-Maxwellian distribution (non-thermal plasma) because the Boltzmann transport equation assumes the effect of the inelastic collision. It is computationally expensive. A Boltzmann solver can be used to compute EEDF when the EEDF distribution is non-Maxwellian. The GUI of the solver takes input as a collision cross-section database which can be obtained from the LXcat website. The other inputs are gas temperature, ionization degree, plasma density, mean electron energy, and electric field by number density ratio to compute rate and transport coefficients. Additionally, EEDF and rate coefficients can provide adequate knowledge of plasma chemistry. Hence, we use it to verify the ion formation concerning our parameters, such as extraction grid voltage and pressure.

Magnetic Filter Design

The negative charge in the air plasma is a blend of electrons and negative ions ($O^-$ is dominant). These charges can be differentiated based on their mass, gyro radius, and velocity (distance/delay time). The $O^-$ ions are typically formed at lower energies due to the dissociative attachment process. However, the ions get destroyed mainly because of electron impact detachment or mutual neutralization with $O^+$ and $O_2^+$ ions. Therefore, researchers have attempted to measure and study negative oxygen ions using the experimental and modeling approach. For instance, McKnight investigated drift velocities and rate constants for negative oxygen (in oxygen plasma) ions experimentally as a function of electric field-neutral density ratio, pressure, and gas temperature, to verify the calculations with their numerical results. In the field of helicon wave discharge, Mieno et al. experimentally studied negative and positive oxygen ions formation in an oxygen plasma due to rf (radio frequency) power modulation (on-off power) using a time-of-flight mass spectrometer. Additionally, Zhang et al. used a floating harmonic method to investigate negative ion density and electronegativity variation with the radial distance, gas pressure, and power in an inductively coupled plasma. Regarding a mathematical model, the authors obtained a temporal variation of negative ion density by solving a 1D hydrodynamic drift model (motion of charges, ionization, and recombination reactions in a spatial-temporal varying electric field). While most works were conducted for an electronegative gas ($O_2$) plasma, the research lacked experimental negative oxygen ion data for air plasma.

To this end, we propose an approach based on partial magnetization through magnetic field confinement of electrons. The negative ions drifting towards the probe will allow ion current measurement. The magnetic filter length was decided based on the criteria that the dimension ($L_{Tube}$) was selected between the range of Larmor radius for negative ions and electrons. This condition permitted effective electron confinement while ensuring negative ions drift towards the current measuring electrode 2. The measuring tube design system was electrically floating to prevent positive ions from entering electrode 1 (due to the potential difference between electrode 1 and the ground). The length of the tube was inversely related to the applied magnetic field.

The acceleration region design is guided by partial magnetization conditions:

$$\frac{m_e}{eB}\left(\sqrt{\frac{2U_{Battery}e}{m_e}+u_e^2}\right) < L_{Tube} < \frac{m_i}{eB}\left(\sqrt{\frac{2U_{Battery}e}{m_i}+u_i^2}\right) \tag{12}$$

where $m_i$, $U_{Battery}$, $u_e$, $u_i$, and B are oxygen ion mass ($2.65\times10^{-26}$ Kg), applied voltage, initial electron, initial ion velocity (ratio of the distance between AES-tube and delay time), and the applied magnetic field using Alnico permanent magnet (0.12 T). Based on equation 12, a tube length of 5 cm for an applied voltage of 80 V was selected for the experiments such that electrons were radially confined, and the negative ions were not magnetized. The applied voltage results in an electric field between the plasma, electrodes 1 and 2 (FIG. 4) extracting the negative charges (electrons and negative ions) as they move from low to high potential, simultaneously repelling the positive charge. Electrons are confined radially using the radial magnetic field. Even though a strong magnetic field was applied, some electrons would still escape the magnetic field due to anomalous electron transport/because of their high mobility. This resulted in the formation of 2 peaks in the time-varying current waveforms. The current was measured using Ohm's law for a potential drop across a 15Ω resistor. Later, we discuss the results about negative ion current measurements below.

Results

In this section, the positive and negative air ion formation by the AES were analyzed.

Plasma Parameters

Figure 14A:
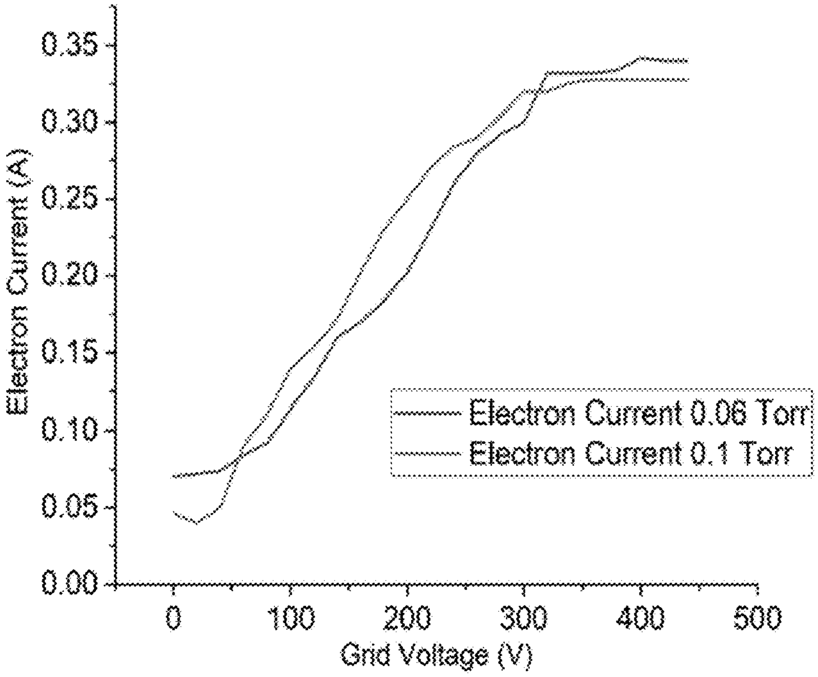
FIG. 14 shows a variation of the electron, FIG. 14A, and ion, FIG. 14B, saturation current with grid voltage (mean electron energy) with pressure as a parameter can be seen. The distance between the grid and the vacuum arc source was 25 mm. The currents were measured using a Faraday cup biased to +/−40 V. The cup was 35 mm away from the AES. The ion current measured was the saturated current in the air. The increase in the ion current was because of an increase in the electron current with grid voltage indicating air ionization.

The ion and electron current as a function of grid voltage and pressure (mean electron energy) are presented in FIGS. 14A, B.

Figure 14B:
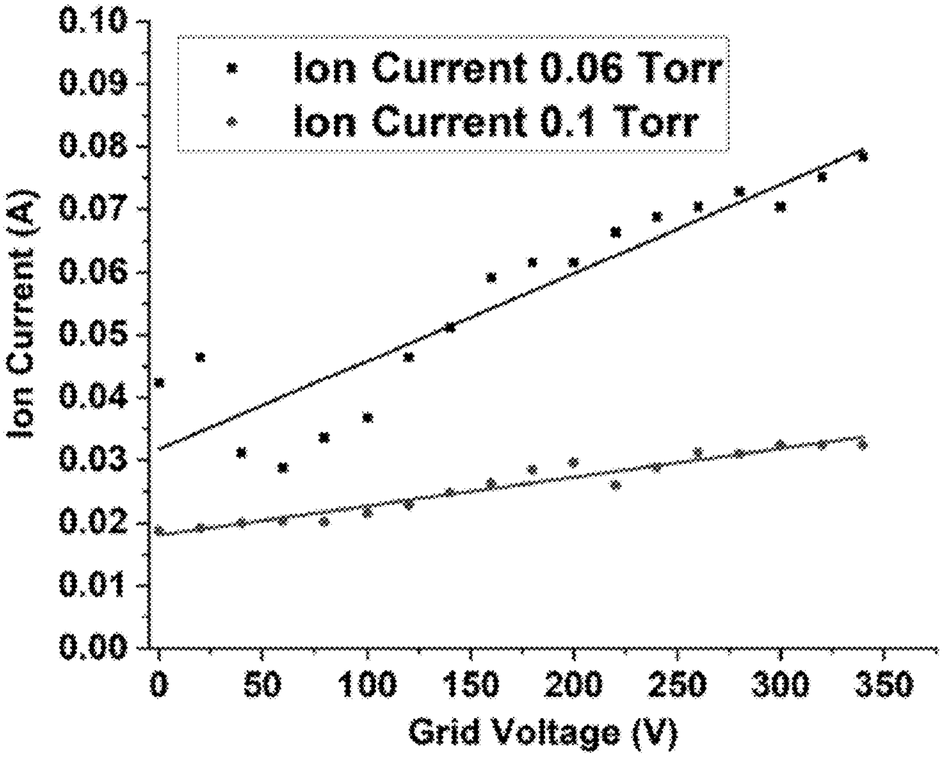

The distance between the grid and source was set to prevent arcing and secondary electron emission in a medium pressure regime. The total ion current (saturated around −40 V) can be seen in FIG. 14B. It increases with the extraction voltage indicating the ionization. Later we show that based on the OES data a low emission/density of vacuum source copper ions above the grid can be seen indicating air ionization. The increase in the ion current can be 2.5 (0.06 Torr) times up to 330 V.

The current-voltage characteristics measured by the Langmuir probe yield the following electron temperature values 1.82 eV, 1.15 eV, and 1.63 eV for pressures 0.05 Torr, 0.07 Torr, and 0.09 Torr, respectively. These values are typical for vacuum arc sources (1 eV-2 eV). These temperatures were calculated at the grid voltage of 0 V. Additionally, electron temperatures with grid voltages were obtained more accurately using OES results discussed below. First, the electron temperatures were utilized to calculate the electron density. Later, the estimated electron densities were used to obtain the ion formation rate.

Figure 15:
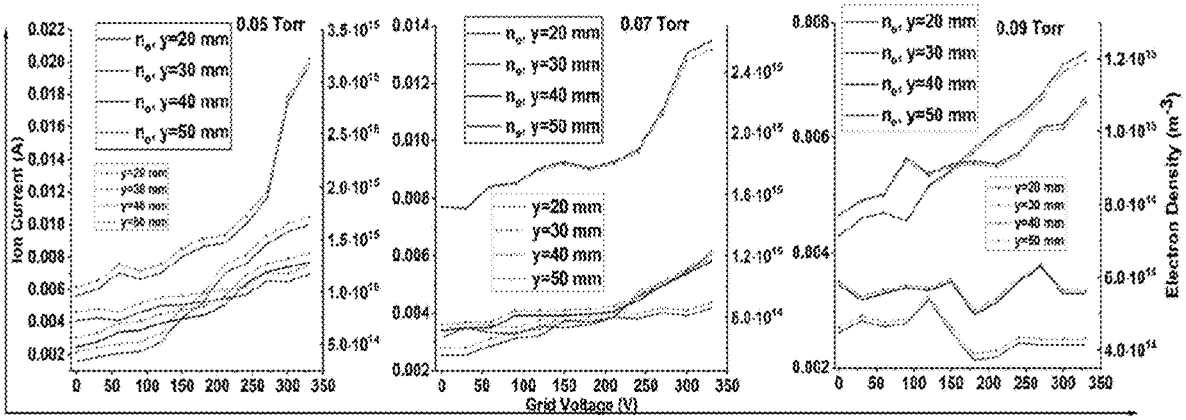
FIG. 15 shows ion current along with computed electron densities as a function of the extraction grid voltage for distances 20 mm-50 mm at the pressure 0.05 Torr, 0.07 Torr, and 0.09 Torr.

The ion current variation with the grid voltage can be observed in FIG. 15. The maximTorr0um saturated ion current and electron densities were 20.2 mA and $3.17\times10^{15}$ $m^{-3}$. These conditions were obtained at 330 V, 0.05 Torr, and 20 mm distance (FIG. 15). The maximum ion currents and electron densities for 0.07 Torr and 0.09 Torr pressure conditions were 13 mA, 7.5 mA, $2.53\times10^{15}$ $m^{-3}$, $1.21\times10^{15}$ $m^{-3}$. At 0.07 Torr and 0.09 Torr, there was airflow into the plasma chamber, whereas 0.05 Torr was the base pressure. The bias of the probe was −40 V as the saturated current was received. The increase in axial distance (between the cup and the AES) resulted in reducing the electron density. Plume expansion and attachment lead to electron density decay. The increment in the electron density with grid voltage indicated air ionization. Our earlier results confirmed that the electron densities increased with the mean electron energy as the ionization reaction rate coefficient is a function of electron temperature.

OES Measurements

The OES analysis was performed for 2 cases. The first case involved placing the OES probe between the vacuum arc source and the extraction grid, and for the second case, the probe was placed above the grid.

The results show the OES spectrum dominated by $$Cu^+$$

ion emissions (FIG. 16) between the grid and the vacuum ar source. When the probe was placed above the grid, the intensities for $$N_2^+$$

were more significant for the 300 V grid voltage case than 0 V. This indicates additional ionization previously observed by the Langmuir probe. The line ratio method can determine the relation between mean electron temperature, electron density, EEDF, rate coefficients, and formation rate with grid voltage and pressure.

Figure 16:
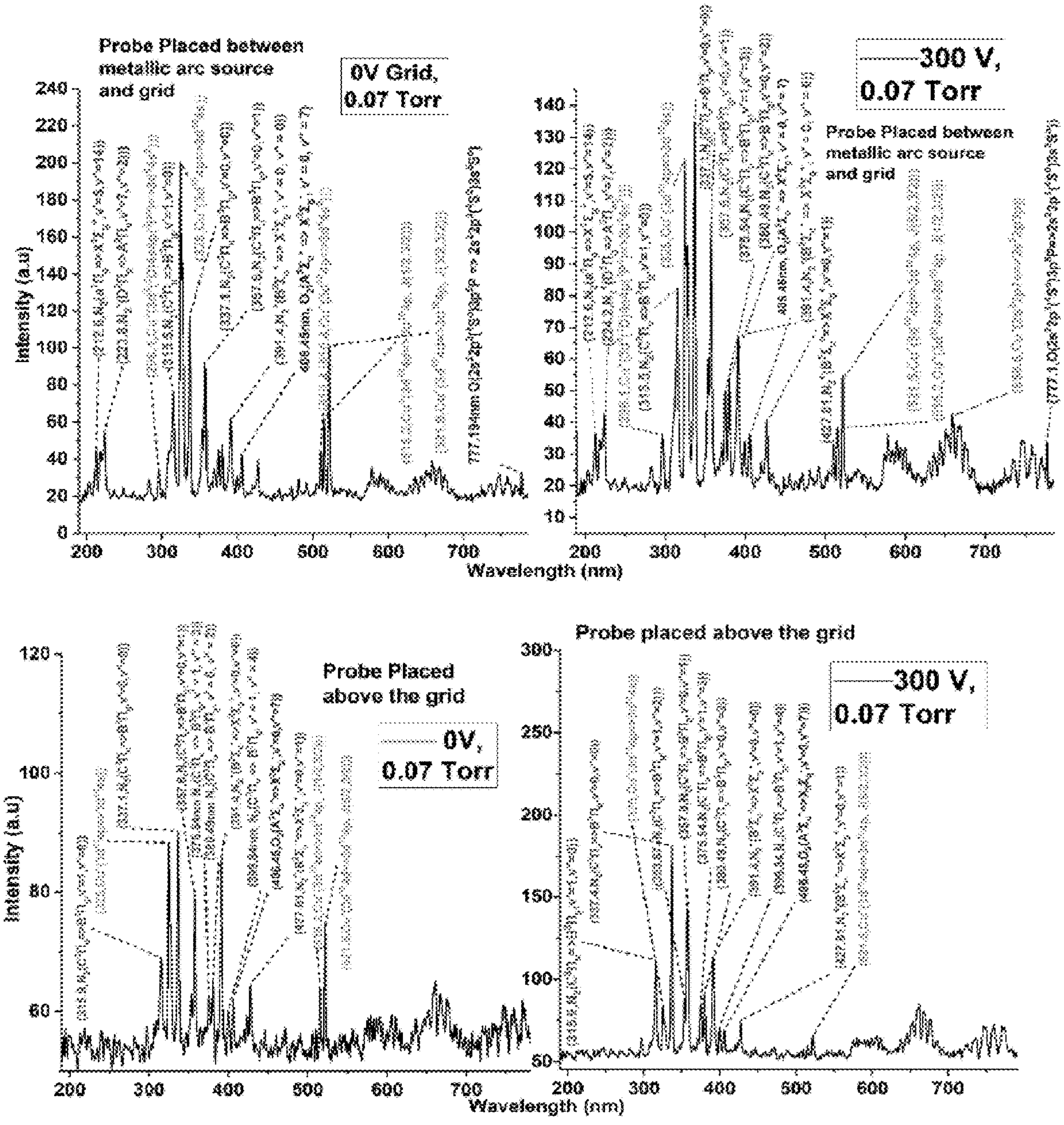
FIG. 16 shows the OES data (orange-Copper, red-Nitrogen, blue-Oxygen). The observed results are at 0 V and 300 V grid voltage for 0.07 Torr chamber pressure.
Figure 17:
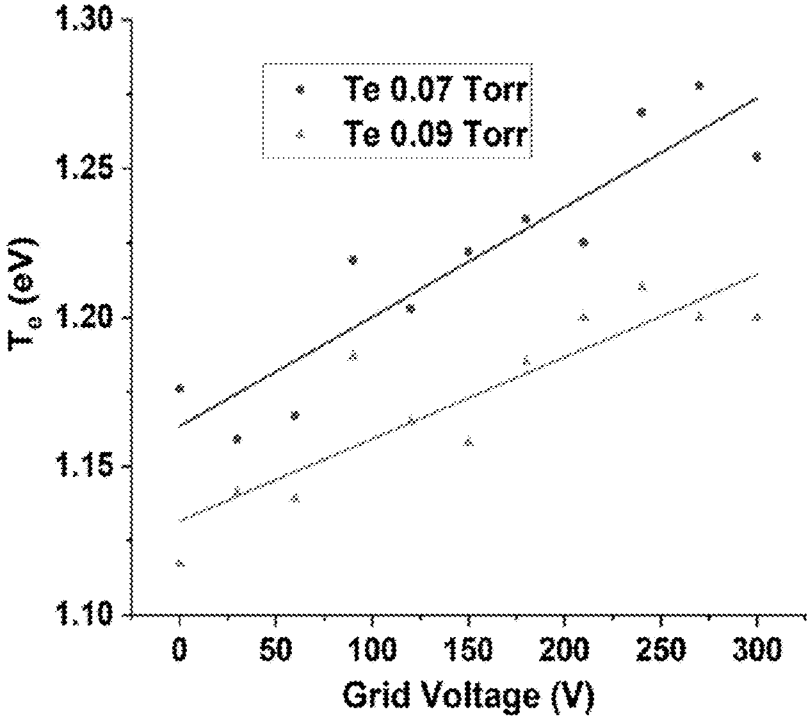
FIG. 17 shows the results of the electron temperature as a function of grid voltage and pressure obtained from the OES.

When the probe was placed above the grid, most intensities were seen in FIG. 16 originate from nitrogen species as it contributes to a significant fraction of air. The transitions shown for wavelengths 337.1 nm, 357.6 nm, 315.9 nm, 375.54 nm, and 380.49 nm belong to the second positive nitrogen system ($C^3\Pi_u$–$B^3\Pi_g$). This system frequently occurs in arcs at low pressures (Ref. 20, refer to pg. 219). The line ratio analysis for molecules is complex due to their higher degrees of freedom. Hence, the electron temperature was obtained using the spectral lines of $$Cu^+$$

ions. The $Cu^+$ ion spectral lines at 325 nm and 521.5 nm that is $$Cu^+(3d^{10}4p{=>}3d^{10}4s)$$

and $$Cu^+(3d^{10}4p{=>}3d^{10}4p,\ J(5/2,\ 3/2)),$$

were selected. These peak lines indicate closeness to ionization levels and a higher population of excited/ionized particles according to the NIST database website. Equation 10 was curve fitted to obtain electron temperature variation with grid voltage for 0.07 Torr and 0.09 Torr pressure (with airflow in the chamber). The computed results in FIGS. 16-19 indicate the effect of extraction grid voltage and pressure on electron temperature, rate coefficients, and spectral line intensities. The increment in the electron temperature was seen for both 0.07 Torr and 0.09 Torr pressure conditions. The electron temperature obtained from the OES experiments ranged between 1.1 eV-1.27 eV (FIG. 8), close to that obtained from the Langmuir probe analysis. The electron temperature increase was a clear indication of air ionization as the electron impact rate of ion formation (equations 11 and 13) is directly proportional to the electron temperature. The OES emission results include an oxygen peak $$\left(406.45\text{ nm},\ A^3\sum\nolimits_u^+{=>}X^3\sum\nolimits_g^-,\ v'=0,\ v''=7\right)$$

of special interest and it is shown in FIG. 18. The $O_2$ $$\left(406.45\text{ nm},\ A^3\sum\nolimits_u^+{=>}X^3\sum\nolimits_g^-,\ v'=0,\ v''=7\right)$$

emission line indicates the Herzberg System that exists generally at high pressures in air plasma discharges.

The OES experiments were conducted for 0.07 Torr –0.5 Torr pressure ranges for grid voltages of 0 V-6 V to potentially prove the presence of $O^-$ ions in the air plasma. The lower voltage ranges were selected because the attachment rate coefficients dominate the ionization rates in mean electron energies less than 5 eV. Based on FIG. 18A, the peak intensity of 88 (a.u) was seen at the pressure of 0.15 Torr for the oxygen emission line. Additionally, experiments were conducted at 0.15 Torr pressure for 0 V-300 V grid voltages. In the lower voltages (<4 V), the emission intensity reduces (potentially due to electron attachment to oxygen) and then increases from 5 V-300 V, indicating ionization.

Based on measured electron temperature and electron density one can calculate the rate of formation of the ion through electron impact:

$$R_f = k_k n_e n_n \tag{13}$$

where, $R_f$, $n_e$, and $n_n$ are the rate of ion formation ($s^{-1}$), electron, and neutral density ($N_2$ or $O_2$, $m^{-3}$). The results for $R_f$ can be seen in FIG. 19 for attachment and ionization reactions. The rate coefficients were obtained from the electron temperature (as a function of grid voltage from the OES results) and solving equation 11. The $N_2$ and $O_2$ neutral density for the 0.07 Torr and 0.09 Torr were utilized to calculate the ion rate formation. These were calculated based on the ideal gas law (gas temperature 300 K) as $2.22\times10^{21}$ $m^{-3}$ and $2.86\times10^{21}$ $m^{-3}$.

The electron density at a 20 mm distance from Faraday cup experiments for 0.07 Torr and 0.09 Torr was used for calculations. The formation rate can be utilized to study the special-temporal evolution of ion/electron number densities in plasma by solving the chemical kinetics equation. Typically, ionization reaction rate coefficients increase with mean electron energy and vice versa for attachment reactions. It can be seen that the $O^-$ ion formation from the FIG. 19 is more significant (<5 V) than positive ions as the electron impact collision cross-sections for the dissociative electron attachment reactions peak in lower electron energies (<2.5 eV). The electron attachment reaction occurred due to dissociative attachment. Therefore, the formation of negative ions due to oxygen's electronegativity could be used as an advantage to achieve charge neutralization with positive ions for the SABPT, as previously described. In conclusion, the electron temperature and formation rate obtained using OES indicated ionization and electron attachments (negative ion formation) as a function of grid voltage and pressure. In the following section, we describe a magnetic filter drift tube to characterize negative ion formation.

Magnetic Filter Measurements

Negative ion current measurements are shown in FIG. 20 and FIG. 21. The temporally varying current waveforms indicated two peaks. The first peak is likely due to electrons, while the second peak corresponds to negative ions. The peaks for negative ion current were observed below 5 V grid voltage. Consequently, with rising grid voltage, the negative ion current is reduced (due to ionization, recombination, and electron detachment) as shown in FIG. 19. The peak negative ion current was seen around 40 mA (0.05 Torr), more significant than the positive ion current.

Earlier, it was observed that the coefficient for the attachment was more significant than the ionization reaction below 5 eV temperature. The plasma temperature obtained from the experiments was in the 1 eV-2 eV range. Therefore, the temperature was not high enough to create higher ionization. Additionally, the grid voltage was below 5 V (mean electron temperature); we see a more significant negative ion current than a positive ion current. FIG. 20 shows the temporal variation of negative ion current waveforms as a function of chamber pressure (0.05 Torr-0.15 Torr) for 0 V grid voltage. FIG. 21 shows the linear fit negative ion current variation as a function of grid voltage (0 V-30 V) and chamber pressure (0.05 Torr-0.15 Torr).

As previously discussed, the SABPT would operate by controlling the mean electron energy of the electron source to produce positive and negative ions. The proposed electron source for the SABPT design (AES) contained an electron extraction grid that could potentially be pulsed in the range of 0 V-300 V to produce maximum positive and negative ion densities. Furthermore, quantitative analysis based on experimental results has been described in the next section.

Concluding Remarks

The present disclosure aimed to characterize a magnetic field-enhanced AES for air ionization applications inside a SABPT. It was designed using a vacuum arc plasma source coupled with an electron extraction grid. The grid enabled the control of the mean electron energy. Experimentally, it was shown that the positive ion current, electron current, electron density, and electron temperature increased with an increment in the grid voltage. On the contrary, the measured negative ion current reduced with the grid voltage. Furthermore, a combination of Langmuir probe/Faraday cup, OES, and magnetic filter tube plasma diagnostics enabled us to characterize the AES.

The mechanism of SABPT involves alternating the electron energy of an electron source to create positive and negative ions to achieve self-neutralization. It has been shown that the negative oxygen ion formation rate was higher in the case of low electron energy (1 eV-2 eV) while high electron energy leads to a higher positive ion formation rate. It was obtained that the maximum positive and negative ion currents are 20.2 mA and 40 mA respectively, the electron density is about $3\times10^{15}$ $m^{-3}$, and the electron temperature is about 1.1-1.2 eV. While self-neutralization. Presented experimental results suggest that conditions for the self-neutralizing air-breathing plasma thruster proposed theoretically can be achieved. Further scaling up of the system in power and size is needed to produce thrust for VLEO application.

Controller 130

As discussed in embodiment A, the entry and exit electrodes 104, and 112 are controlled to create either positive ions or negative ions. For example, when the entry electrode 104 is positive and the exit electrode 112 is negative, then positive ions are extracted. When the entry electrode 104 is negative and the exit electrode 112 is positive, then negative ions are extracted. Thus, modulating between high and low allows the charge densities to be canceled out at the exit of channel 103. And in embodiment B, the grid controls the formation of positive or negative ions.

In one example embodiment A, a controller 130 (FIGS. 1A, 1E) can be provided to control the operation of the electrodes 104, and 112, as well as the magnetic field generated by the magnets 110, and the electron particles generated by the electron source 106. The Controller 130 is in communication with the electrodes 104, 112, magnets 110, and/or electron source 106, either wirelessly or wired. In one embodiment B, a controller 230 (FIG. 1C) can be provided to control the operation of grid 250, as well as the arc source 210. The Controller 230 is in communication with the grid 250 and/or arc source 210, either wirelessly or wired.

Controllers 130, and 230 can include a processing device to perform various functions and operations in accordance with the disclosure. The processing device can be, for instance, a computer, personal computer (PC), server or mainframe computer, or more generally a computing device, processor, or application-specific integrated circuits (ASIC). The processing device can be provided with one or more of a wide variety of components or subsystems including, for example, a co-processor, register, data processing devices, subsystems, wired or wireless communication links, input devices (such as touch screen, keyboard, mouse) for user control or input, monitors for displaying information to the user, and/or storage device(s) such as memory, RAM, ROM, DVD, CD-ROM, analog or digital memory, flash drive, database, computer-readable media, floppy drives/disks, and/or hard drive/disks. All or parts of the system, processes, and/or data utilized in the system of disclosure can be stored on or read from the storage device(s). The storage device(s) can have stored thereon machine-executable instructions for performing the processes of the disclosure. The processing device can execute software that can be stored on the storage device. Unless indicated otherwise, the process is preferably implemented automatically by the processor substantially in real-time without delay.

It is noted that the disclosure refers to specific components, such as permanent magnets (e.g., FIG. 1I), and electromagnets (e.g., FIG. 1D). It will be appreciated that any suitable components can be utilized, such for example any suitable magnets such as pulsed or DC magnets.

Additionally, two thrusters can be arranged parallel, coaxially, or in other orientations to each other, operating by extracting charges of either (positive and negative ions) polarity to achieve neutralization.

It is further noted that the drawings may illustrate, and the description and claims may use geometric or relational terms, such as inner, outer, inside, enclose, tube, rod, and concentric. These terms are not intended to limit disclosure and, in general, are used for convenience to facilitate the description based on the examples shown in the figures. In addition, the geometric or relational terms may not be exact. For instance, walls may not be exactly perpendicular or parallel to one another because of, for example, the roughness of surfaces, tolerances allowed in manufacturing, etc., but may still be considered to be perpendicular or parallel.

The description and drawings of the present disclosure provided in the present disclosure should be considered illustrative only of the principles of the disclosure. The disclosure may be configured in a variety of ways and is not intended to be limited by the preferred embodiment. Numerous applications of the disclosure will readily occur to those skilled in the art. Therefore, it is not desirable to limit the disclosure to the specific examples disclosed or the exact construction and operation shown and described. Rather, all suitable modifications and equivalents may be resorted to, falling within the scope of the disclosure.

The invention claimed is:

1. A plasma thruster comprising:

a ring-shaped tunable electron source configured to provide electrons radially inward with controllable energy;

an entry electrode and an exit electrode configured for an axial air flow to pass from the entry electrode to the exit electrode, said entry electrode and exit electrode further configured to receive electrons from said tunable electron source; and a controller configured to selectively control an entry electrode polarity and an exit electrode polarity to accelerate positive ions and negative ions in the axial air flow and neutralize charge.

2. The thruster of claim 1, wherein said tunable electron source is tunable to change electron energy to produce positive ions at high electron energy and negative ions at low electron energy.

3. The thruster of claim 1, wherein said controller is configured to tune electron energy in said tunable electron source and maintain applied polarity to accelerate positive and negative ions and control thrust of said thruster.

4. The thruster of claim 3, wherein the polarity alternates to alternatively extract positive ions and negative ions to provide self-neutralization.

5. The thruster of claim 1, wherein said controller is configured to control the entry and exit electrodes and said tunable electron source to achieve a desired thrust.

6. The thruster of claim 1, wherein said tunable electron source comprises an electron extraction grid or any tunable electron source.

7. The thruster of claim 1, further comprising a magnet having a cusp-based magnetic field that maintain electric field in crossed E×B configuration that accelerates the ionized air flow.

8. The thruster of claim 1, wherein said controller modulates the entry and exit electrodes to generate positive ions or negative ions whereby the positive ion density and negative ion density are neutralized.

9. The thruster of claim 1, wherein said controller controls the entry electrode to be positive with respect to the exit electrode, to accelerate positive ions.

10. The thruster of claim 1, wherein said controller controls the entry electrode to be negative with respect to the exit electrode, to accelerate negative ions.

11. The thruster of claim 1, wherein neutral plasma plume is obtained in the absence of an external neutralizer.

12. A plasma thruster comprising:

a ring-shaped arc electron source comprising:

a first ring-shaped anode;

a second ring-shaped anode;

a ring-shaped cathode positioned between the first ring-shaped anode and the second ring-shaped anode to form a high electric field to generate and arc plasma in an axial air flow; and a ring-shaped electron extraction grid configured to radially extract electrons from the arc plasma to ionize air molecules in the arc plasma and control electron energy to control thrust of said thruster.

* * * * *